United States Patent
Carter et al.

(10) Patent No.: US 9,544,857 B2
(45) Date of Patent: Jan. 10, 2017

(54) POWER MANAGEMENT IN A CELLULAR SYSTEM

(71) Applicant: UBIQUISYS LIMITED, Swindon (GB)

(72) Inventors: Alan James Auchmuty Carter, Swindon (GB); Raymond Kwan, Shaw (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 53 days.

(21) Appl. No.: 14/360,898

(22) PCT Filed: Oct. 10, 2012

(86) PCT No.: PCT/GB2012/052511
§ 371 (c)(1),
(2) Date: May 27, 2014

(87) PCT Pub. No.: WO2013/079913
PCT Pub. Date: Jun. 6, 2013

(65) Prior Publication Data
US 2015/0038190 A1 Feb. 5, 2015

(30) Foreign Application Priority Data

Nov. 28, 2011 (GB) .................................. 1120462.5

(51) Int. Cl.
*H04W 52/26* (2009.01)
*H04W 52/34* (2009.01)
(Continued)

(52) U.S. Cl.
CPC ........... *H04W 52/26* (2013.01); *H04W 52/244* (2013.01); *H04W 52/267* (2013.01);
(Continued)

(58) Field of Classification Search
CPC ..................................................... H04W 52/26
See application file for complete search history.

(56) References Cited

U.S. PATENT DOCUMENTS 6,141,565 A 10/2000 Feuerstein et al.
6,771,934 B2 8/2004 Demers
(Continued)

FOREIGN PATENT DOCUMENTS

CN 102 271 414 12/2011
CN 104684052 A 6/2015
(Continued)

OTHER PUBLICATIONS

PCT—Feb. 13, 2013 International Search Report and Written Opinion from International Application PCT/GB2012/052511; 28 pages.
(Continued)

*Primary Examiner* — Bobbak Safaipour
(74) *Attorney, Agent, or Firm* — Patent Capital Group

(57) ABSTRACT

A method of controlling the respective transmit powers allocated by a base station of a cellular communications network to each of a plurality of sub-bands is provided. Information from at least one other base station of the network is received, the information comprising information about a sensitivity of a utility function in a cell served by the other base station to changes in powers allocated to respective sub-bands by the base station. A sub-band is identified in which it would be relatively advantageous to increase a transmit power. It is determined whether a factor relating to a happiness of users in the cell exceeds a threshold value. The transmit power in the identified sub-band is increased only if the happiness factor is less than the threshold value.

14 Claims, 11 Drawing Sheets

(51) Int. Cl.
  *H04W 52/14* (2009.01)
  *H04W 52/24* (2009.01)
  *H04B 17/309* (2015.01)
  *H04B 17/382* (2015.01)

(52) U.S. Cl.
  CPC ....... *H04W 52/343* (2013.01); *H04W 52/346* (2013.01); *H04B 17/309* (2015.01); *H04B 17/382* (2015.01); *H04W 52/143* (2013.01); *H04W 52/241* (2013.01); *H04W 52/242* (2013.01); *H04W 52/245* (2013.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amirijoo et al. |
| 8,145,223 B2 | 3/2012 | Guey |
| 8,145,252 B2 | 3/2012 | Sung et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,270,976 B2 | 9/2012 | Simonsson et al. |
| 8,275,376 B2 | 9/2012 | Vikberg et al. |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 2002/0061742 A1* | 5/2002 | Lapaille ............. H04B 7/18539 455/414.1 |
| 2004/0085909 A1 | 5/2004 | Soliman |
| 2004/0132486 A1 | 7/2004 | Halonen |
| 2004/0213170 A1* | 10/2004 | Bremer ................. H04L 5/1423 370/282 |
| 2005/0064820 A1 | 3/2005 | Park et al. |
| 2005/0215251 A1* | 9/2005 | Krishnan ............. H04L 5/0023 455/434 |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2006/0292989 A1 | 12/2006 | Gerlach |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0004028 A1* | 1/2008 | Vincent ................. H04W 16/00 455/446 |
| 2008/0043623 A1* | 2/2008 | Franceschini ..... H04B 17/382 370/235 |
| 2008/0084844 A1* | 4/2008 | Reznik ................. H04L 1/0025 370/330 |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1* | 10/2008 | Huang ................. H04B 7/024 455/425 |
| 2009/0005030 A1 | 1/2009 | Han |
| 2009/0054047 A1 | 2/2009 | Kylvaja |
| 2009/0092088 A1* | 4/2009 | Kokku ................. H04W 52/146 370/329 |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0110989 A1* | 5/2010 | Wu ....................... H04L 47/10 370/328 |
| 2010/0112982 A1 | 5/2010 | Singh et al. |
| 2010/0124930 A1 | 5/2010 | Andrews |
| 2010/0177722 A1 | 7/2010 | Guvenc |
| 2010/0227611 A1 | 9/2010 | Schmidt et al. |
| 2010/0233962 A1 | 9/2010 | Johansson |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267338 A1 | 10/2010 | Chiu |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2011/0034174 A1 | 2/2011 | Xu |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0201277 A1 | 8/2011 | Eguchi |
| 2011/0211514 A1 | 9/2011 | Hamalainen |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1* | 4/2012 | Truong ................. H04W 52/46 455/9 |
| 2012/0087247 A1 | 4/2012 | Min et al. |
| 2012/0087266 A1 | 4/2012 | Vajapeyam |
| 2012/0100849 A1 | 4/2012 | Marsico |
| 2012/0129537 A1 | 5/2012 | Liu et al. |
| 2012/0176980 A1 | 7/2012 | Moon et al. |
| 2012/0178451 A1 | 7/2012 | Kubota |

(56) References Cited

U.S. PATENT DOCUMENTS

| | | |
|---|---|---|
| 2012/0231797 A1 | 9/2012 | Van Phan et al. |
| 2012/0235774 A1 | 9/2012 | Nakahashi et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1* | 10/2013 | Takaoka ............... H04L 5/0035 370/328 |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois et al. |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1* | 5/2014 | Kwan ............... H04W 24/08 455/422.1 |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0171143 A1 | 6/2014 | Liu |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0018028 A1 | 1/2015 | Uplenchwar et al. |
| 2015/0055479 A1 | 2/2015 | Reider |
| 2015/0063223 A1 | 3/2015 | Shen |
| 2015/0063231 A1 | 3/2015 | Seo et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1 | 8/2015 | Zhao et al. |
| 2015/0256314 A1 | 9/2015 | Gauvreau et al. |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0373698 A1 | 12/2015 | Uplenchwar et al. |
| 2015/0382367 A1 | 12/2015 | Yanover et al. |
| 2016/0073426 A1 | 3/2016 | Bull et al. |
| 2016/0127069 A1 | 5/2016 | Nuss et al. |
| 2016/0150442 A1* | 5/2016 | Kwan ............... H04W 24/08 455/453 |
| 2016/0157126 A1 | 6/2016 | Nuss et al. |
| 2016/0165485 A1* | 6/2016 | Kwan ............... H04W 24/08 455/453 |
| 2016/0198412 A1 | 7/2016 | Uplenchwar et al. |
| 2016/0219596 A1 | 7/2016 | Yanover et al. |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO 2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

(56) References Cited

FOREIGN PATENT DOCUMENTS

OTHER PUBLICATIONS

Rengarajan, B., et al., "A Semi-autonomous Algorithm for Self-organizing Dynamic Fractional Frequency Reuse on the Uplink of OFDMA Systems", Dec. 14, 2009 pp. 1-22, XP002611469 http://ect.bel1-1abs.com/who/stolyar/publications/newrldffr.pdf.

Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.

Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.

United Kingdom Intellectual Property Office Search Report Under Section 17(6) in GB Patent Application Serial No. GB1120462.5 mailed on Mar. 27, 2012 [Notification regarding Claims 1-22 and 45-47].

United Kingdom Intellectual Property Office Search Report Under Section 17(6) in GB Patent Application Serial No. GB1120462.5 mailed on Jan. 19, 2013 [Notification regarding Claims 23-31].

United Kingdom Intellectual Property Office Search Report Under Section 17(6) in GB Patent Application Serial No. GB1120462.5 mailed on Jan. 19, 2013 [Notification regarding Claims 32-38].

United Kingdom Intellectual Property Office Search Report Under Section 17(6) in GB Patent Application Serial No. GB1120462.5 mailed on Jan. 19, 2013 [Notification regarding Claims 39-44].

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—FRANCE, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, Euro-

(56) References Cited

OTHER PUBLICATIONS pean Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute 2012, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cede—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release

(56) References Cited

OTHER PUBLICATIONS

12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2104) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON)

(56) References Cited

OTHER PUBLICATIONS

Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.

(56) References Cited

OTHER PUBLICATIONS

"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitigation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013; http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

(56) References Cited

OTHER PUBLICATIONS

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"PDCCH Processing," published by Gio Zakradze on Dec. 29, 2014; 56 pages.

"Plane (in networking)," Definition from WhatIs.com; Jan. 2013 http://whatis.techtarget.com/definition/plane-in-networking.

Piro, G., et al., "An LTE module for the ns-3 Network Simulator," in Proc. of Wns3 2011 (in conjunction with SimuTOOLS 2011), Mar. 2011, Barcelona Spain.

Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.

"Quadrature amplitude modulation," from Wikipedia, the free encyclopedia, Apr. 22, 2015; 11 pages.

"QoS Class Identifier," from Wikipedia, the free encyclopedia, Oct. 7, 2015.

"RADIUS," Wikipedia, the free encyclopedia, 12 pages [Retrieved and printed Oct. 11, 2013] http://en.wikipedia.org/wiki/RADIUS.

"Received signal strength indication," Wikipedia, the free encyclopedia, Dec. 22, 2014; 2 pages.

"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.

Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.

Saad, Sawsan A., et al., "A Survey on Power Control Techniques in Femtocell Networks," Journal of Communications vol. 8, No. 12, Dec. 2013; 10 pages.

Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.

Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.

Seo, H., et al., "A proportional-fair power allocation scheme for fair and efficient multiuser OFDM systems," in Proc. Of IEEE GLOBECOM, Dec. 2004, Dallas (USA).

Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.

Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.

Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.

"Transmission Time Interval," from Wikipedia, the free encyclopedia, May 2, 2013.

UKIPO Dec. 20, 2013 Search Report from GB Application U.S. Appl. No. GB1312321.1, 6 pages.

Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.

Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.

Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.

Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.

"Whats is Uplink RSSI in LTE," TelecomSource thread, May 22, 2013; 5 pages http://www.telecomsource.net/howthread.php?5464-Whats-is-Uplink-RSSI-in-LTE.

Wubben, Dirk, et al., "Benefits and Impact of Cloud Computing on 5G Signal Processing," IEEE Signal Processing Magazine, Nov. 2014.

Xiong, Chao, "Enhanced ICIC for LTE-A HetNet," ZTE Corporation, LTE World Summit 2012, May 2012; 3 pages.

Zyren, Jim, "Overview of the 3GPP Long Term Evolution Physical Layer," White Paper, Freescale Semiconductor, Document No. 3GPPEVOLUTIONWP; Jul. 2007; 27 pages.

EPO Jul. 29, 2014 Extended Search Report from European Application Serial No. EP13195673, 12 pages.

EPO Aug. 12, 2014 Extended EPO Search Report and Opinion from European Application Serial No. 13195780.8.

EPO Nov. 19, 2015 Extended Search Report and Written Opinion from European Application EP13767700; 9 pages.

EPO Mar. 26, 2015 Extended Search Report and Opinion from European Application Serial No. EP14190541.

PCT Jul. 16, 2013 International Search Report and Written Opinion from International Application PCT/IL2013/050269, 3 pages.

PCT Oct. 1, 2014 International Preliminary Report on Patentability from International Application PCT/IL2013/050269, 4 pages.

PCT Mar. 17, 2014 International Search Report and Written Opinion from International Application Serial No. PCT/IL2013/000086, 12 pages.

PCT Jun. 16, 2014 International Search Report and Written Opinion of the International Searching Authority for International Application Serial No. PCT/IL2013/000085.

U.S. Appl. No. 14/479,343, filed Sep. 7, 2014, entitled "Operation of Base Station in a Cellular Communication Network," Inventor: Simon Burley.

U.S. Appl. No. 15/015,691, filed Feb. 4, 2016, entitled "System and Method for Optimizing Performance of a Communication Network," Inventor(s): Ziv Nuss, et al.

U.S. Appl. No. 14/818,084, filed Aug. 4, 2015 entitled "Resource Adaptation for Frequency Domain Downlink Inter-Cell Interference Coordination," Inventors: Ritesh K. Madan et al.

U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.

U.S. Appl. No. 14/811,580, filed Jul. 28, 2015 entitled "Determining Fractional Frequency Reuse Power Levels for Downlink Transmissions," Inventor: Ritesh K. Madan.

U.S. Appl. No. 14/816,957, filed Aug. 3, 2015 entitled "Selecting Cells for Downlink Inter-Cell Interference Coordination," Inventors: Rohit U. Nabar et al.

U.S. Appl. No. 14/816,990, filed Aug. 3, 2015 entitled "User Equipment Power Level Selection for Downlink Transmissions," Inventors: Vikram Chandrasekhar et al.

U.S. Appl. No. 14/679,868, filed Apr. 6, 2015, entitled "System and Method for Managing Interference in a Network Environment Based on User Presence," Inventors: Mark Grayson, et al.

U.S. Appl. No. 14/687,198, filed Apr. 15, 2015, entitled "System and Method for Managing Interference in a Network Environment Based on User Presence," Inventors: Mark Grayson, et al.

(56) References Cited

OTHER PUBLICATIONS

U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010-Jul. 20, 2010, Jun. 22, 2010 (Jun. 22, 2010), XP050598481, [retrieved on Jun. 22, 2010] Section 3, 4 pages.
QUALCOMM Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, No. Jacksonville, USA; Nov. 15, 2010, Nov. 9, 2010 (Nov. 9, 2010), XP050492195, [retrieved on Nov. 9, 2010] Section 16.X.2, 5 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
U.S. Appl. No. 15/089,252, filed Apr. 1, 2016, entitled "Method and System for Dynamic Allocation of Resources in a Cellular Network".

\* cited by examiner

POWER MANAGEMENT IN A CELLULAR SYSTEM

CROSS-REFERENCE TO RELATED APPLICATIONS

This application is a national stage application under 35 U.S.C. §371 of PCT International Application Serial No. PCT/GB2012/052511, filed on 10 Oct. 2012 and entitled POWER MANAGEMENT IN A CELLULAR SYSTEM, which application claims the benefit of priority to GB Patent Application Serial No. 1120462.5 filed on 28 Nov. 2011 and entitled POWER MANAGEMENT IN A CELLULAR SYSTEM. The disclosures of the prior applications are considered part of and are hereby incorporated by reference in their entirety in the disclosure of this application.

This invention relates to a cellular telephone network, and in particular to methods for controlling the power of signals transmitted by base stations within such a network, in order to reduce the interference effects of such transmissions, while maintaining required performance of the network. The invention also relates to base stations in such a network.

Fourth generation (4G) cellular systems such as the Long-Term Evolution (LTE) are currently being developed in order to improve both system performance and user data rate, compared with third generation systems. Although such systems are designed to improve system performance and user data rate, strong emphasis is given to enhancing system performance for users at the cell edge. One of the most effective ways to achieve such improvements is by power and interference management.

While power and interference management is originally designed to increase systems and user performance by reducing unnecessary interference, it is important to realize that this can be achieved by reducing transmit powers as much as possible while still meeting a certain satisfaction objective. By eliminating unnecessary transmit power, it is possible to significantly improve the energy efficiency. While the energy efficiency for a single base station may not be a serious matter, it is highly relevant if a large network of base stations is deployed.

In a typical deployment scenario, a cell does not exist alone, which means that each cell is likely to be surrounded by neighbouring cells. Thus, as a mobile user moves away from the serving base station towards a neighbouring cell, the call quality degrades, not only due to the weakening of the serving base station signal, but also the increase of the interference coming from the dominant neighbouring cell(s). Such interference is often known as inter-cell interference, and the mitigation of such interference has been considered, in order to boost the experience of the cell-edge users. Interference management for LTE is more complicated than in the legacy 3G systems such as the Wideband Code Division Multiple Access (WCDMA) systems, as LTE systems involve the allocation of power in both time and frequency domains, while WCDMA systems involve only the time-domain allocation.

One well-known method to mitigate inter-cell interference is via the use of what is known as fractional frequency reuse (FFR), in which mobile users in the centre of every cell are allocated the same frequency, whereas users at the cell edges are allocated a subset of frequencies that are different from those at the edges of the immediate neighbour cell. As a result, the inter-cell interference at the cell edges can be significantly reduced (R. Kwan, C. Leung, "A Survey of Scheduling and Interference Mitigation in LTE", Volume 2010, Article ID 273486).

While FFR and its variants are well-known techniques for interference mitigation, they suffer from the drawback that the subsets of frequencies used for the cell-edge mobile users need to be carefully planned, and this planning is typically done statically during the network planning stage. As a result, such methods are not suitable for femtocells, in which base stations are deployed in an ad hoc manner. Also, these methods do not take into account the dynamic user traffic distributions, and thereby reduce the efficiency of the spectrum utilization.

On the other hand, it is possible to make the allocation of power and frequency resources vary dynamically by allocating frequency, power, modulation and coding schemes (MCS) jointly for each user in a cell in a centralized fashion (D. López-Pérez, G. de la Roche, A. Valcarce, A. Jüttner, J. Zhang, "Interference Avoidance and Dynamic Frequency Planning for WiMAX Femtocells Networks", Proc. of ICCS, 2008). However, such an approach requires a centralized entity, and the computation complexity is impractically high.

In A. L. Stolyar, H. Viswanathan, "Self-organizing Dynamic Fractional Frequency Reuse for Best-Effort Traffic Through Distributed Inter-cell Coordination", *proc. of IEEE Infocomm*, April 2009, a gradient-based algorithm is presented, in which the frequency reuse patterns are dynamically adapted to the traffic distribution. As this approach is self-organizing among cells in a distributive fashion, frequency planning is not required. Also, this method not only provides a way to assign frequency in a distributive manner, it also allows the power to be adjusted dynamically in frequency, and thereby provides an extra degree of flexibility. While this approach is useful, the document does not provide details regarding how Quality of Service (QoS) can be taken into account in the formulation. As a result, the power allocation may not necessarily be appropriate to what the services actually require, thereby reducing the power efficiency. Also, while the document provides a useful framework in dynamic interference mitigation, issues regarding implementation aspects remain open. For example, the formulation assumes an exact knowledge of the analytical relationship between the spectral efficiency and the signal-to-interference and noise ratio (SINR). In practice, there is no such fixed relationship, due to the fact that different vendors may have their own receiver implementation, and, therefore, different performance.

According to an aspect of the present invention, there is provided a method of controlling the respective transmit powers allocated by a base station of a cellular communications network to each of a plurality of sub-bands, the method comprising:
  receiving information from at least one other base station of said network, said information comprising information about a sensitivity of a utility function in a cell served by said other base station to changes in powers allocated to respective sub-bands by said base station;
  identifying a sub-band in which it would be relatively advantageous to increase a transmit power;
  determining whether a factor relating to a happiness of users in the cell exceeds a threshold value; and
  increasing the transmit power in the identified sub-band only if the happiness factor is less than the threshold value.

According to an aspect of the present invention, there is provided a method of controlling the respective transmit powers allocated by base stations of a cellular communications network to each of a plurality of sub-bands, the method comprising:

transmitting information from a first base station to at least one other base station of said network, said information comprising information about a sensitivity of a utility function in a cell served by said first base station to changes in powers allocated to respective sub-bands by said other base station, wherein said step of transmitting information comprises transmitting information to the at least one other base station over an X2-interface.

A method of controlling the respective transmit powers allocated by base stations of a cellular communications network to each of a plurality of sub-bands, the method comprising:

transmitting information from a first base station to at least one other base station of said network, said information comprising information about a sensitivity of a utility function in a cell served by said first base station to changes in powers allocated to respective sub-bands by said other base station, wherein said step of transmitting information comprises transmitting information relating to the Relative Narrowband Transmit Power of said cell in each of said sub-bands.

According to an aspect of the present invention, there is provided a method of determining an effect of interference in a cell served by a base station of a cellular communications network, said interference being caused by transmissions from a base station in at least one neighbouring cell of said network, the method comprising:

obtaining measurements from mobile devices connected to the base station; and using the measurements to derive a measure of the sensitivity of a utility function in said cell served by said base station to changes in powers allocated to respective sub-bands by said other base station.

According to an aspect of the present invention, there is provided a method of estimating a spectral efficiency of a sub-band in a base station on a cellular communications network, the method comprising:

approximating the spectral efficiency by a power function of a Channel Quality Indicator reported by a mobile device making measurements on that sub-band;

approximating the Channel Quality Indicator by a linear function of a Signal to Interference and Noise Ratio measured by the mobile device, wherein the Signal to Interference and Noise Ratio is measured in decibels.

According to an aspect of the present invention, there is provided a method of controlling a base station in a cellular communications network, the method comprising:

for each of a plurality of users, receiving a value representing an initial bit rate requirement for said user;

determining a respective downlink power required to be allocated to said users to achieve said respective bit rate requirements;

determining a total downlink power requirement as a sum of said respective downlink powers required; and when a total downlink power of the base station exceeds a threshold value, reducing a bit rate requirement for at least one of said users to a value below the respective initial bit rate requirement.

According to an aspect of the present invention, there is provided a method of calculating a value for a load on a base station of a cellular communications network, wherein the base station can use a plurality of sub-bands and can use frequency-selective power control, the method comprising:

calculating a value for the load, based on the average power and the average bit rate for each user.

According to an aspect of the present invention, there is provided a method of controlling the respective transmit powers allocated by a base station of a cellular communications network to each of a plurality of sub-bands, the method comprising:

in the base station, obtaining channel quality information from mobile devices connected to the base station;

for each sub-band, forming an average channel quality measure using channel quality information from said mobile devices; and from said average channel quality measures, estimating information about a sensitivity of a utility function in a cell served by said base station to changes in powers allocated to respective sub-bands by other base stations.

According to an aspect of the present invention, there is provided a basestation adapted to perform the method of any other aspect.

For a better understanding of the present invention, and to show how it may be put into effect, reference will now be made, by way of example, to the accompanying drawings, in which:—

Figure 12:
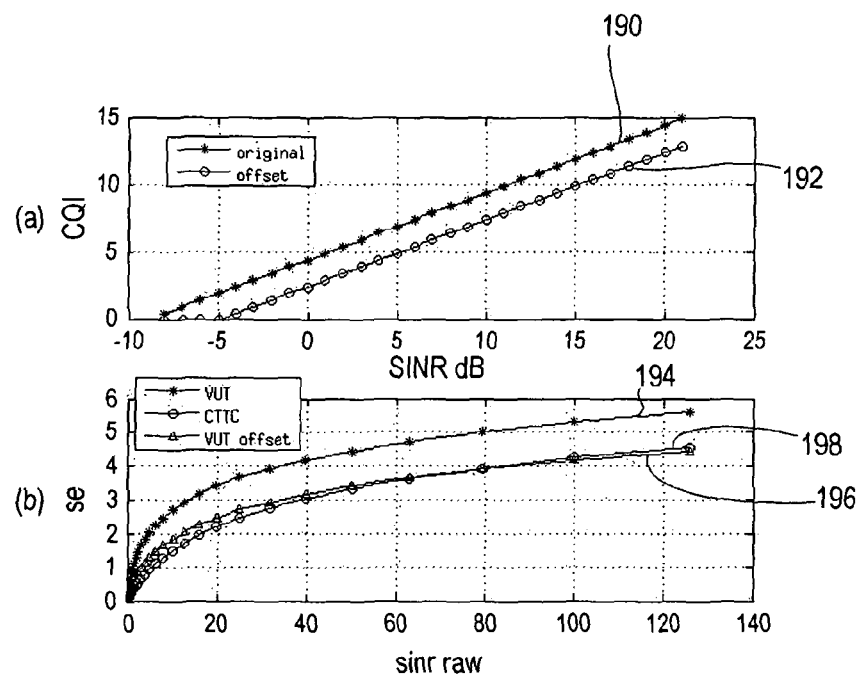

FIG. 12 further illustrates a relationship between Signal to Interference and Noise Ratio, a Channel Quality Indicator, and spectral efficiency.

Figure 13:
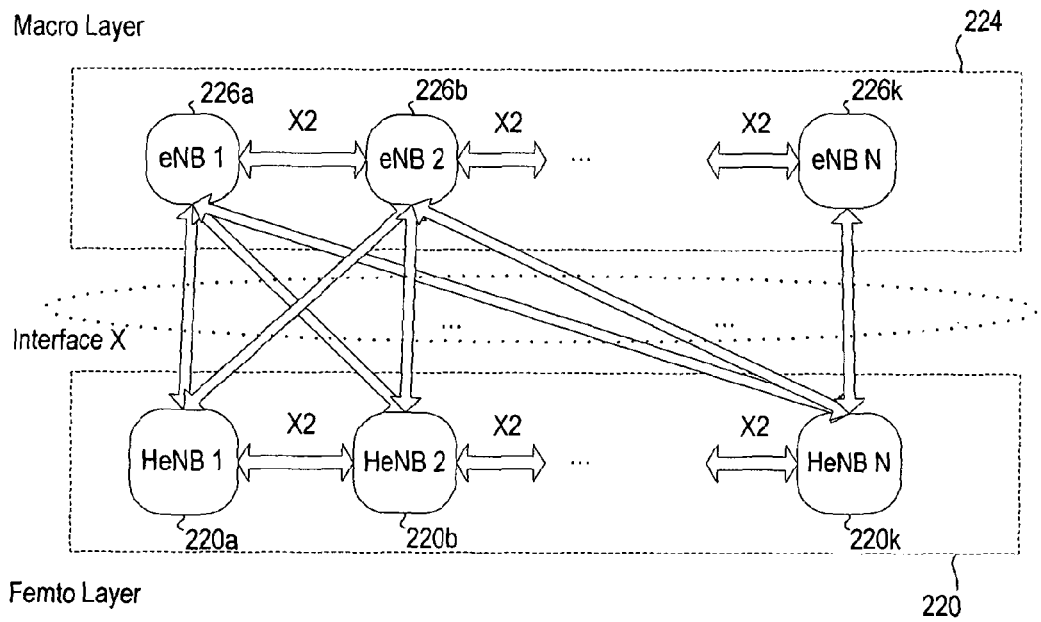

FIG. 13 illustrates the available connections between base stations in a possible deployment of femtocell and macrocell base stations.

Figure 14:
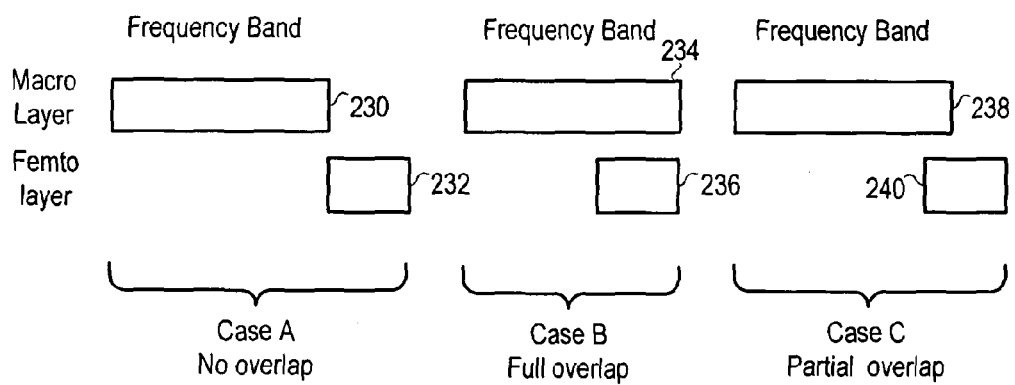

FIG. 14 illustrates frequency allocations in possible deployments of femtocell and macrocell base stations.

Figure 15:
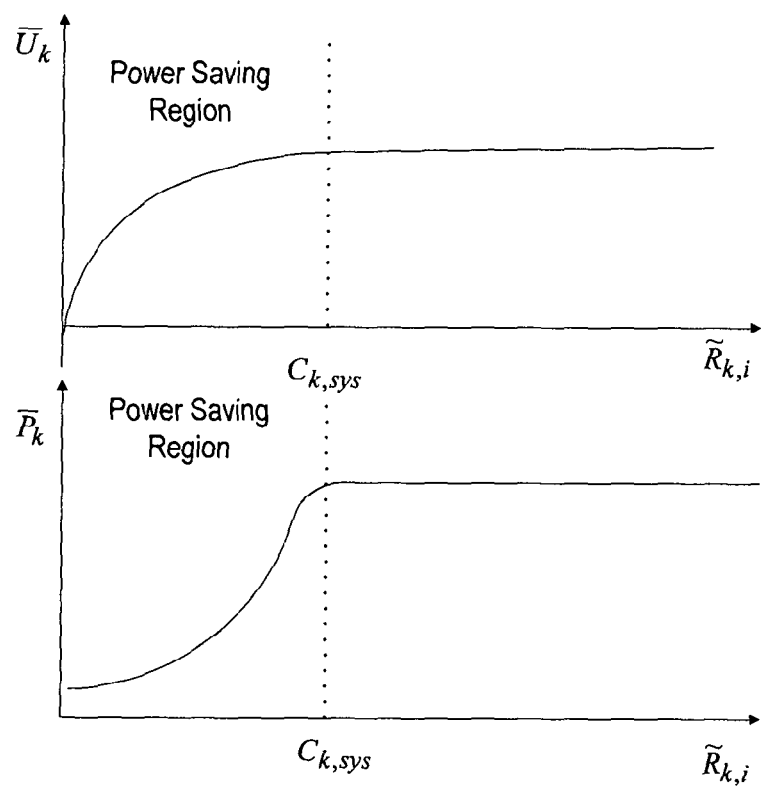

FIG. 15 illustrates relationships between utility, power and required bit rate.

Figure 16:
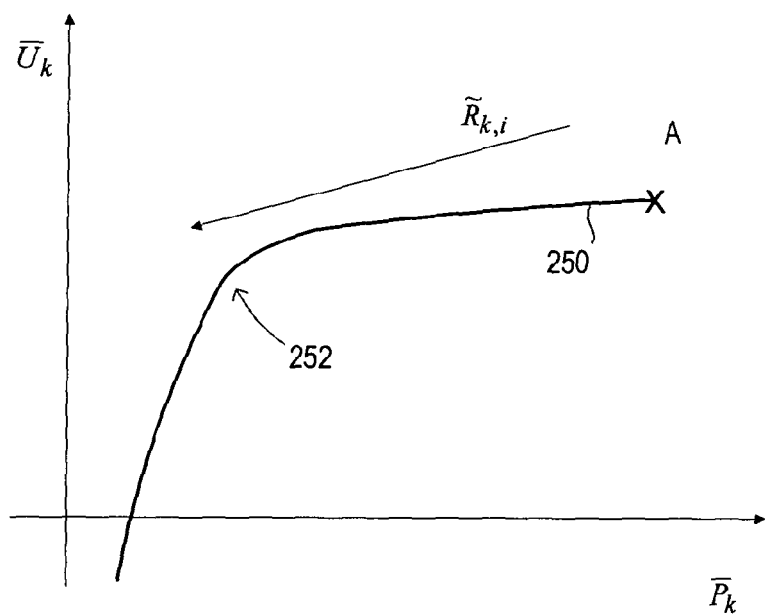

FIG. 16 is a second illustration of the relationships between utility, power and required bit rate.

Figure 1:
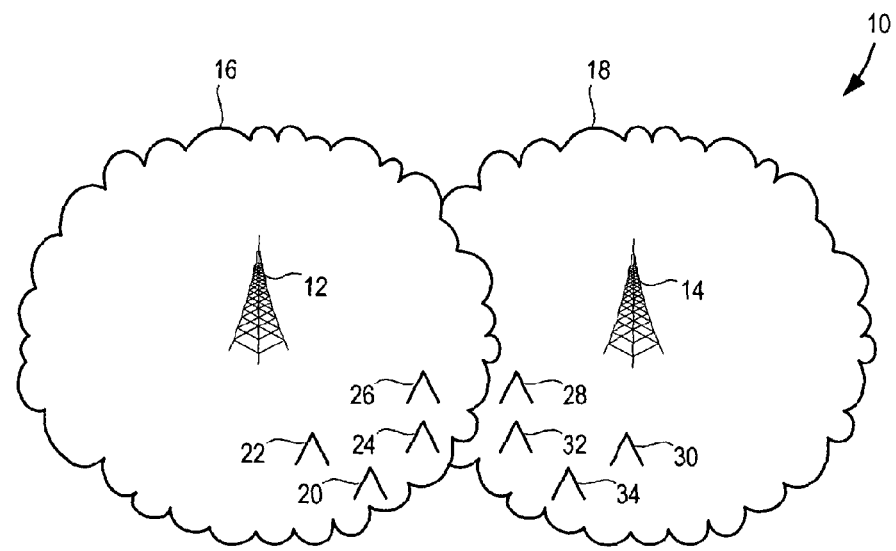
FIG. 1 shows a part of a cellular communication network, operating in accordance with fourth generation (4G) cellular standards such as the Long-Term Evolution (LTE).

FIG. 1 shows a part of a cellular communication network 10, operating in accordance with fourth generation (4G) cellular standards such as the Long-Term Evolution (LTE). The network 10 includes macrolayer base stations, or enhanced Node B's (eNBs), 12, 14, serving respective cells 16, 18, it being appreciated that there is a region of overlap between the two cells 16, 18, in which a user equipment device would be able to establish a connection with either of the base stations 12, 14.

Located within the cells 16, 18 are a number of femtocell base stations, or Home enhanced Node B's (HeNBs), 20, 22, 24, 26, 28, 30, 32, 34, each serving a respective cell in its immediate vicinity. As is well known, there may be tens, hundreds, or even thousands of femtocells within one macrocell. FIG. 1 shows only a small number of such femtocells for the purposes of clarity. For example, the femtocells might be individually owned by customers of the cellular network, or they might be under the common management of the premises in which they are located, such as a shopping mall, university campus, office park or large office building.

Figure 2:
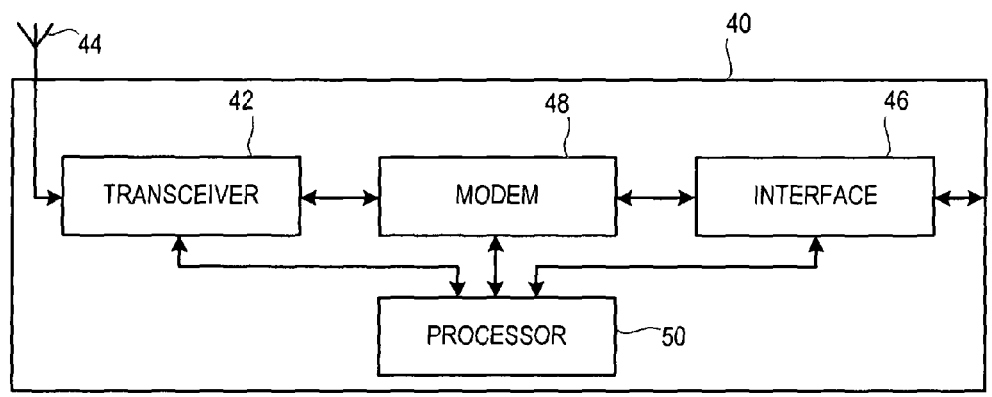
FIG. 2 shows a base station in the network of FIG. 1.

FIG. 2 shows in more detail the form of one of the base stations in the network. The base station 40 shown in FIG. 1 might be a macrolayer base station or a femtocell base station.

The base station 40 has transceiver circuitry 42, for converting signals to and from the formats required for transmission over the air interface. As mentioned above, in this illustrative example, the base station is intended to form part of an LTE network, and the transceiver circuitry therefore converts the signals to and from the formats required for this. An antenna 44 is connected to the transceiver circuitry 42.

The base station also has interface circuitry 46, for connection to the rest of the network. Where the base station 40 is a femtocell base station, the interface circuitry 46 might for example be suitable for converting signals to and from the formats required for transmission over a broadband internet connection. Where the base station 40 is a macrolayer base station, the interface circuitry 46 might for example be suitable for converting signals to and from the formats required for transmission over a dedicated link to the core network of the cellular communications network.

A modem 48 is connected between the transceiver circuitry 42 and the interface circuitry 46, for processing the signals and extracting relevant data therefrom. The modem 48, the transceiver circuitry 42 and the interface circuitry 46 operate under the control of a processor 50, as described in more detail below.

One of the aspects of the operation of the base station 40 that is controlled by the processor 50 is the allocation of users to particular frequency channels, and the allocation of particular power levels to the available channels. Increasing the power of signals to one particular user will typically improve the service that can be provided to that user, for example by increasing the available data rate, but it might worsen the service that can be provided to other users, for example by increasing the level of interference that they will detect.

We assume here that we have K cells, with $k \in \tilde{K}=\{1,2,\ldots,K\}$ and J sub-bands $j \in \tilde{J}=\{1, 2, \ldots \tilde{J}\}$ in the system. Furthermore, we assume that each sub-band consists of a fixed number of sub-carriers. Also, it is assumed that time is slotted, and that transmissions within each cell are synchronized, so that intra-cell interference is not present. Two generic quantities are particularly relevant to an inter-cell interference coordination scheme for LTE-based systems.

The first one is the concept of utility, which generally quantifies the level of satisfaction of the entity involved. Let U be a global utility function of the system, which is given by $$U=\Sigma_k U_k. \qquad (1)$$

It represents the sum of all utility functions among all cells, where $U_k$ is the utility function of cell k, which is given by the sum of the utility $U_{k,i}$ among all users for cell k, i.e. $U_k=\Sigma_i U_{k,i}$. The idea is to find a way (or ways) to improve, or preferably maximize, the global utility function U.

The second quantity is the transmit power. Here, in the context of Orthogonal Frequency Division Multiple Access (OFDMA) systems such as LTE, the transmit power is expected to be frequency dependent. Let $P_{k,j}$ be the power allocated in sub-band j of cell k, and the maximum power cell k can have is $P_k$, i.e. $\Sigma_j P_{k,j} \leq P_k$. The whole problem of inter-cell interference coordination reduces to how $P_{k,j}$, $\forall j$ is allocated for each k in order to improve or maximize U.

In A. L. Stolyar, H. Viswanathan, "Self-organizing Dynamic Fractional Frequency Reuse for Best-Effort Traffic Through Distributed Inter-cell Coordination", *proc. of IEEE Infocomm*, April 2009, a gradient-based method is proposed, in which the global utility is improved sub-optimally in a distributive fashion. The main idea of the proposed method is as follows:

Let $D_j(m,k)=\partial U_k/\partial P_{m,j}$, i.e. the rate of change of the utility function $U_k$ for cell k, with respect to the transmit power cell m has allocated for sub-band j. The quantity corresponds to the change of the level of satisfaction that a cell m would incur at sub-band j of cell k. For the purpose of discussion, this quantity will also be called the D value for simplicity. Obviously, an increase in $P_{m,j}$ may potentially have negative impact on $U_k$ when $k \neq m$ (i.e. cell m is a neighbour cell), as such an increase would give rise to additional interference at sub-band j coming from cell m, and vice versa. On the other hand, when k=m, an increase of power at sub-band j would enhance the signal quality at this particular sub-band, and would have a positive impact on its own utility.

It can be noted that $D_j(m,k)$ is not very useful if it is considered in only one cell at a time. However, when it is exchanged among neighbour cells, it allows the neighbour cells to know the level of impact caused in the other cells when a certain power level is allocated at each sub-band. By receiving $D_j(m,k)$ from the neighbour cells, cell k would then aggregate them for each sub-band j, i.e.

$$D_j(k)=\Sigma_m D_j(k,m), \qquad (2)$$

(where the switch of the indices m and k represents the fact that cell k is now the neighbour cell of each of the neighbour cells m), including the case of k=m.

In other words, $D_j(k)$ corresponds to the aggregate sensitivity of the utility function to all cells due to the perturbation of its own transmit power at sub-band j.

When $D_j(k)<0$, a positive power increment would incur a negative impact on the aggregate satisfaction among all cells, and vice versa. The general idea proposed in the prior art document discussed above is for cell k to increase the power by selecting a sub-band associated with the largest positive value of $D_j(k)$, and vice versa.

Let $\delta P>0$ be a fixed parameter, let $P_k=\Sigma_j P_{k,j}$ be the total power currently used, and let $\tilde{P}_k$ be the power limit. In each of $n_p$ time slots, cell k updates the power sequentially as follows:

1. Set $P_{k,j_*}=\max(P_{k,j_*}-\delta P, 0)$, where $j_*$ is the sub-band index, such that $D_{j_*}(k)$ is the smallest among all j's, given that $D_j(k)<0$ and $P_{k,j}>0$.
2. If $P_k<\tilde{P}_k$, set $P_{k,j_*}=P_{k,j_*}+\min(\tilde{P}_k-P_k,\delta P)$, where $j_*$ is the sub-band index, such that $D_{j_*}(k)$ is the largest among all j's, where $D_j(k)>0$.
3. If $P_k=\tilde{P}_k$, and $\max_j D_j(k)>0$, set $P_{k,j_*}=\max(P_{k,j_*}-\delta P, 0)$, and $P_{k,j^*}=P_{k,j^*}+\min(P_{k,j_*},\delta P)$, where $D_{j^*}(k)$ and $D_{j_*}(k)$ are the largest and smallest among those j's which are $P_{k,j}>0$ and $D_{j_*}(k)<D_{j^*}(k)$.

In this illustrated embodiment, the downlink power adjustment algorithm takes account of the quality of service (QoS) experienced by the users.

A common utility function for cell k is typically defined as the sum of the logarithms of the average bit rates over all users within the cell k. This utility function is rooted in economics, and is motivated by the fact that a fixed increase in bit rate is more important for low bit rate than for users who are already enjoying a high bit rate. Another advantage of such a function is that it is smooth and continuously differentiable, thereby simplifying the complexity in computing the utility sensitivity. Despite the above advantages, such a utility function does not readily provide a means to incorporate QoS into the power adjustment mechanism. For example, consider three users served by a base station, having bit rates of 1 Mbps, 2 Mbps, and 3 Mbps respectively. If all three users only require a bit rate of 500 kbps, it may not be efficient to provide more than necessary from the point of view of resource utilization. An unnecessarily high power generates an unnecessary level of interference, which would then have a knock-on effect on the neighbouring cells. In order to maintain a good level of satisfaction, the neighbours would require a higher power, thereby boosting the overall background interference. The reverse is also true: if a base station reduces its power to a level which just meets the user bit rate requirements, the level of interference to its neighbours would reduce. The neighbours, in turn, would require less power to maintain the call quality, thereby emitting lower interference to the original base station. As a result, the original base station, in turn, would then need less power to maintain the call quality. This process continues until the background interference, and, therefore, the transmit powers of all base stations, eventually settles to a lower level.

The implication of the above process is important, as the idea of removing unnecessary power provides a "feedback" mechanism which eventually helps to further reduce the power requirement for a fixed QoS due to the lowering of the overall interference. This lowering of the power requirement translates to an energy saving for the network.

One way to take the QoS into account is to modify the utility function. However, such an approach potentially makes the utility function more complex, and thereby complicates the sensitivity calculation. In this embodiment, we quantify whether a user's expectation is met by a quantity known as the "Happiness Factor", $H_{k,i}$, which is given by:

$$H_{k,i} = \frac{\overline{R}_{k,i}}{\tilde{R}_{k,i}} \tag{3}$$

where:
$\overline{R}_{k,i}$ is the averaged bit rate achieved by user i in cell k, and
$\tilde{R}_{k,i}$ is the corresponding bit rate requirement, which can be directly proportional to the guaranteed bit rate (GBR) (for example as discussed in 3GPP TS 36.413, S1 Application Protocol (S1AP), Release 9, v9.5.1) or can be some function of the GBR.

When $H_{k,i} > 1$, the user is experiencing a bit rate that exceeds expectation. The opposite is true when $H_{k,i} < 1$. Let $H_k^{(n)}$ be the weighted n-th moment of happiness of cell k, i.e.

$$H_k^{(n)} = \frac{1}{N_k} \sum_{i=1}^{N_k} w_{k,i} H_{k,i}^n, \tag{4}$$

where
$N_k$ is the number of users in cell k, and
$w_{k,i}$ is a cell-specific weight for user i in cell k.

This weight can be used to bias the emphasis among users within the cell, and follows the constraint $$\sum_{i=1}^{N_k} w_{k,i} = N_k.$$

As a special case, when $w_{k,1} = w_{k,2} = \ldots = w_{k,N_k} = 1$, $\overline{H}_k = H_k^{(1)}$ reduces to a simple arithmetic mean.

Note that $\overline{H}_k = 1$ implies that the average happiness for cell k meets the expectation. However, it also implies that some users are below expectation, while some are above expectation. While the average is useful to quantify performance in general, a more refined approach is to provide a conservative margin to the average value such that $$H_k = \overline{H}_k - \lambda_k \hat{H}_k, \tag{5}$$

where $H_k$ is known as the "true" happiness, and $\lambda_k$ is a scaling factor which controls the level of "conservativeness". The quantity $\hat{H}_k$ is the weighted standard deviation of happiness within cell k, and is then given by $$\hat{H}_k = \sqrt{H_k^{(2)} - (H_k^{(1)})^2}. \tag{6}$$

Figure 3:
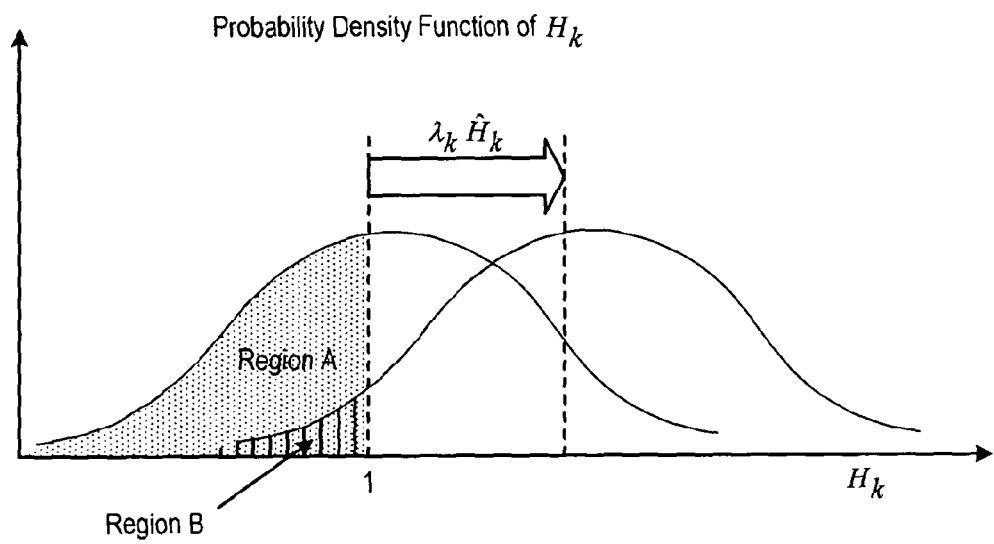
FIG. 3 is a diagram illustrating the effect of considering a happiness factor.

The effect of offsetting the happiness factor in order to increase conservativeness for power adjustment is shown in FIG. 3. FIG. 3 shows the probability density function of $H_k$. With power management operating such that $\overline{H}_k = 1$, the area of Region A in FIG. 3 indicates the probability that the true happiness is below unity. By offsetting the happiness factor by $\lambda_k \hat{H}_k$, the probability that the true happiness is below unity reduces from the area of Region A to that of Region B.

Figure 4:
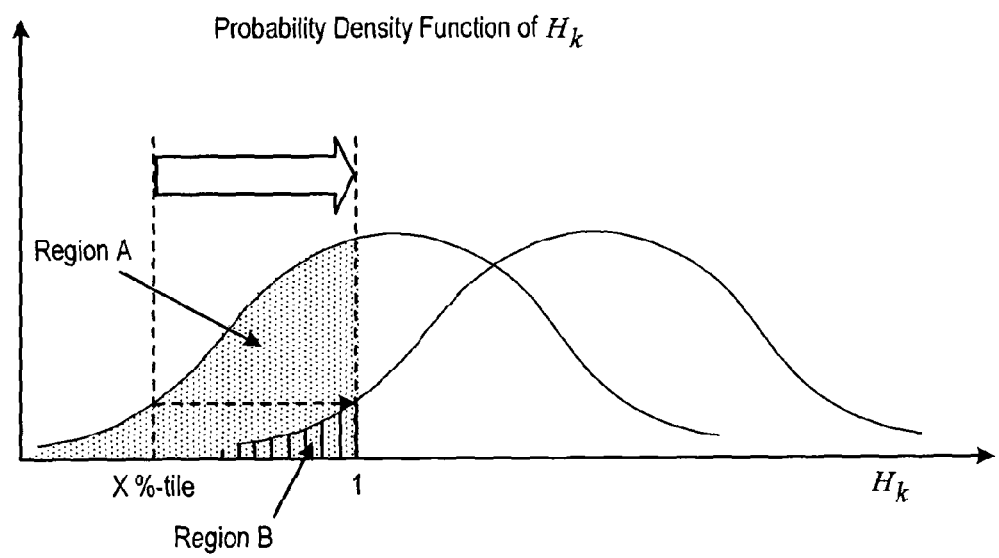
FIG. 4 is a diagram illustrating the effect of considering a modified happiness factor.

FIG. 4 illustrates a more general way to increase conservativeness, by defining $H_k$ as the $X^{th}$ percentile of $H_{k,i}$, $\forall i$. Under this definition, only X % of the happiness would fall below unity as shown in FIG. 4.

Figure 5:
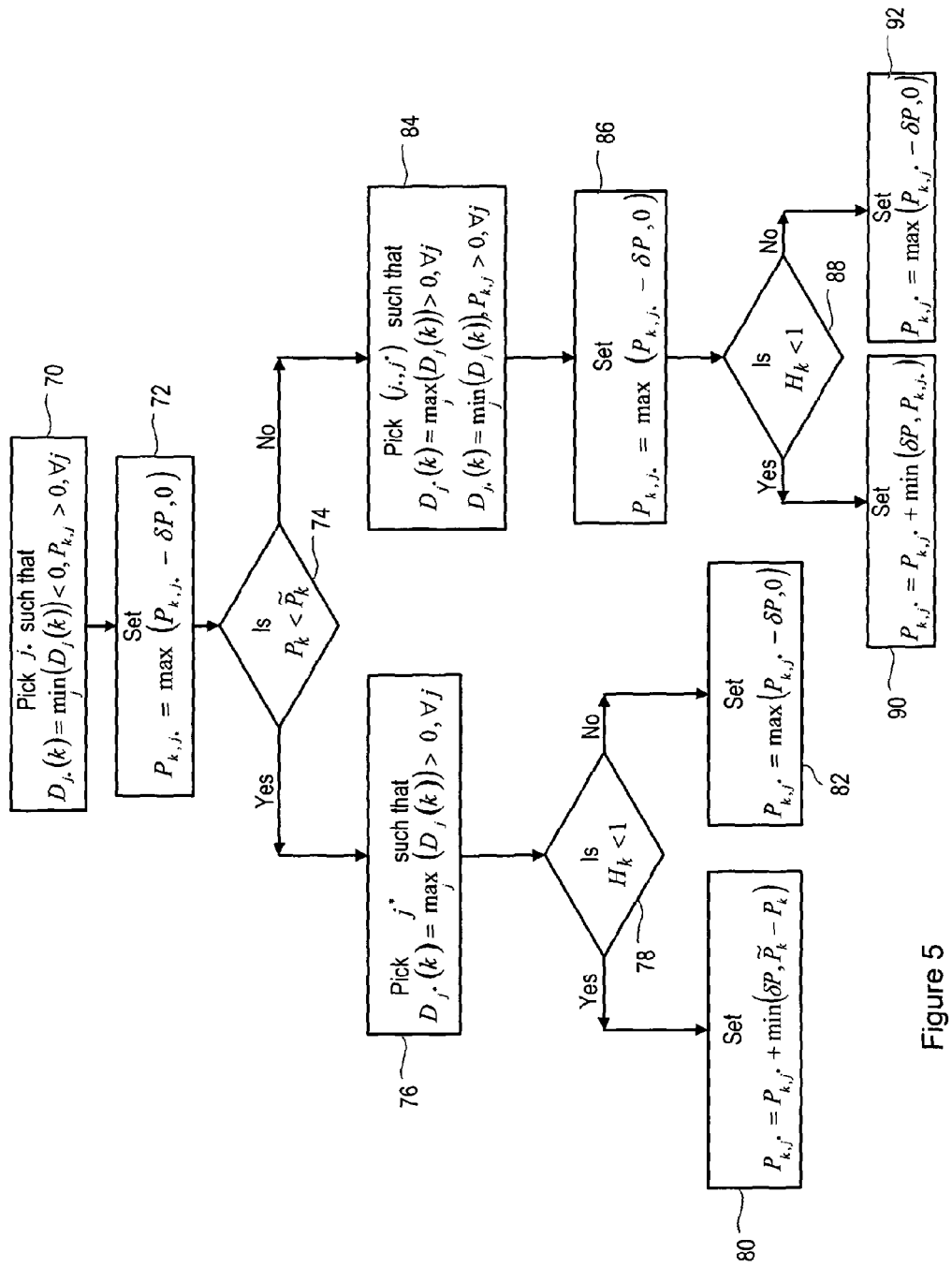
FIG. 5 is a flow chart, illustrating a first method in accordance with the invention.

FIG. 5 shows a process for setting downlink power, incorporating the true happiness factor. This process is repeated periodically.

In step 70, a sub-band index $j_*$ is picked, such that $D_{j_*}(k)$ is the smallest among all j's, given that $D_j(k) < 0$ and $P_{k,j} > 0$. Thus, this step selects the sub-band for which a power decrease would have the most beneficial effect.

The process then passes to step 72, in which the power is reduced in the sub-band index j*. Specifically, the power is reduced by a decrement value δP from its current value $P_{k,j_*}$, although of course it cannot be reduced below zero. Thus, $P_{k,j_*} = \max(P_{k,j_*} - \delta P, 0)$.

After completing step 72, the process passes to step 74. In step 74, it is determined whether the total transmit power for the cell $P_k$ is less than the maximum allowed total power $\tilde{P}_k$.

If the total transmit power for the cell is less than the maximum allowed total power, then the power can be increased in one of the sub-bands, and this sub-band is selected in step 76. Thus, step 76 selects the sub-band for which a power increase would produce the largest beneficial effect. That is, sub-band j* is picked, such that $D_{j^*}(k)$ is the largest among all j's, where $D_j(k) > 0$.

The happiness of the cell is then used to decide whether in fact to increase the power in that sub-band. Specifically, the process passes to step 78, in which it is tested whether the cell is happy. This is determined by testing whether the true happiness is less than unity, i.e. whether $H_k < 1$. If this condition is met, then it is determined that the cell is not happy enough, and the process passes to step 80, in which the power is increased in the sub-band selected in step 76. Specifically, the power is increased by an increment value δP from its current value $P_{k,j^*}$, or by the maximum increment that can be applied without increasing the total power of the cell beyond the maximum allowed total power $\tilde{P}_k$, if the latter increment is smaller. That is, step 80 sets $P_{k,j^*}=P_{k,j^*}+\min(\delta P, \tilde{P}_k-P_k)$.

If it is determined in step 78 that the cell is happy enough, i.e. $H_k \geq 1$, the power is reduced, in order to save energy and increase efficiency. Specifically, the power is reduced by a decrement value δP from its current value $P_{k,j^*}$, although of course it cannot be reduced below zero. Thus, step 82 sets $P_{k,j^*}=\max(P_{k,j^*}-\delta P, 0)$.

If it was determined in step 74 that the maximum total power for the cell is already being used, then the power can be increased in one sub-band only if it is also decreased in another sub-band. Therefore, if it is determined in step 74 that the inequality is not true, the process passes to step 84, in which sub-bands are selected. Thus, a sub-band j* is selected as the most favourable for a power increase, and a sub-band $j_*$ is selected as the most favourable for a power decrease, on the basis that $D_{j^*}(k)$ is the largest value of $D_j(k)$, among all j's, and $D_{j_*}(k)$ is the smallest value of $D_j(k)$ for different values of j for which $P_{k,j}>0$.

Having selected in step 84 the sub-band that is now the most favourable for a power decrease, the process passes to step 86, in which the power is reduced by a decrement value δP from its current value $P_{k,j_*}$, although of course it cannot be reduced below zero. Thus, step 86 sets $P_{k,j_*}=\max(P_{k,j_*}-\delta P, 0)$.

It is then determined whether it is advantageous to increase the power in one of the sub-bands, by reallocating the power that was removed from one of the sub-bands in step 86. Specifically, in step 88, it is tested whether the cell is happy. This is determined by testing whether the true happiness is less than unity, i.e. whether $H_k<1$. If this condition is met, then it is determined that the cell is not happy enough, and the process passes to step 90, in which the power is increased in the sub-band selected in step 86, namely the sub-band in which the increase in power has the greatest beneficial effect. Specifically, the power is increased by the amount by which the power in the sub-band $j_*$ was decreased in step 86. Thus, the power is increased by the increment value δP from its current value $P_{k,j^*}$, or by the previous power in the sub-band j if the latter amount is smaller. That is, step 90 sets $P_{k,j^*}=P_{k,j^*}+\min(\delta P, P_{k,j_*})$.

If it is determined in step 88 that the cell is happy enough, i.e. $H_k \geq 1$, the power is reduced, in order to save energy and increase efficiency. Specifically, the power is reduced by a decrement value δP from its current value $P_{k,j^*}$, although of course it cannot be reduced below zero. Thus, step 92 sets $P_{k,j^*}=\max(P_{k,j^*}-\delta P, 0)$.

Thus, the process tests in steps 78 and 88 whether the true happiness is less than unity, and steps 82 and 92 are able to set lower power values than would otherwise be set, if the true happiness is greater than or equal to than unity.

Figure 6:
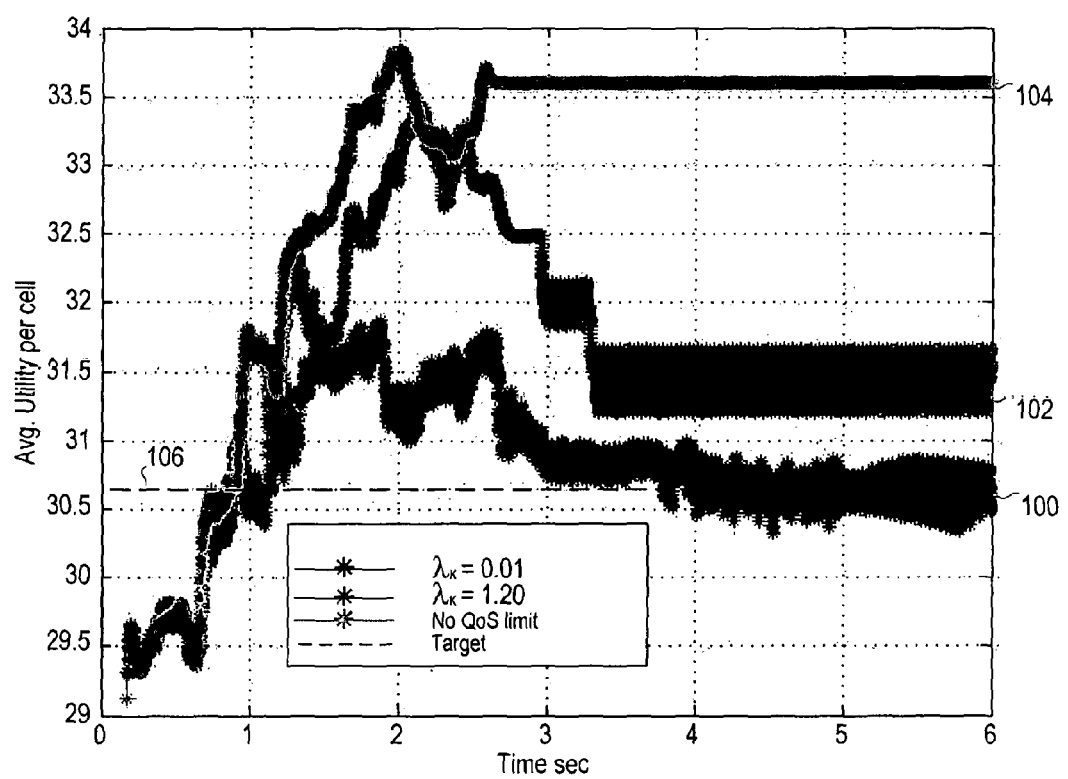
FIG. 6 illustrates a change in utility over time, for various values of a scaling factor.

FIG. 6 illustrates the effect on the achieved utility of choosing different values for the scaling factor $\lambda_k$. Specifically, FIG. 6 shows the average utility per cell (in this illustrative embodiment, this is as defined above, i.e. as the sum of the logarithms of the average bit rates over all users) as a function of time for $\lambda_k=0.01$ (line 100 in FIG. 6) and $\lambda_k=1.20$ (line 102 in FIG. 6) at a target transport block size (TBS) of 70 bytes per Transmission Time Interval (TTI). For comparison purposes, the result for the case without QoS requirement (line 104 in FIG. 6) is also included. At $\lambda_k=0.01$, it can be seen that the average utility tracks the target (line 106 in FIG. 6) reasonably well. As $\lambda_k$ increases to 1.20, the system becomes more conservative, resulting in an increase in the average utility as expected, and hence a reduction in the number of users whose achieved bit rate falls below the required rate. In the case when no QoS limit is applied, the system would use as much power as possible, and the utility is correspondingly higher.

Figure 7:
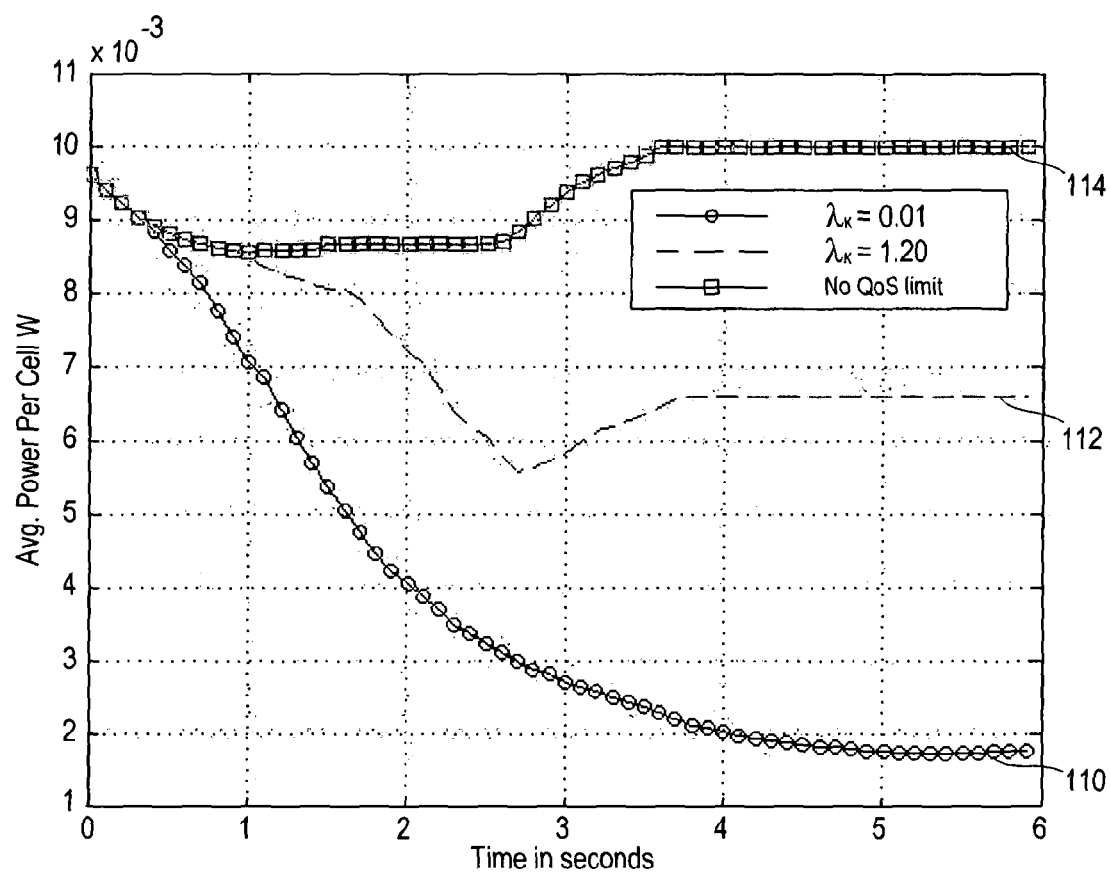
FIG. 7 illustrates a change in power over time, for various values of the scaling factor.

FIG. 7 illustrates the effect on the average power per cell of choosing different values for the scaling factor $\lambda_k$. Specifically, FIG. 7 shows the average power per cell as a function of time for $\lambda_k=0.01$ (line 110 in FIG. 7) and $\lambda_k=1.20$ (line 112 in FIG. 7). For comparison purposes, the result for the case without QoS requirement (line 114 in FIG. 7) is also included. Thus, while the system achieves a higher utility without taking into account the QoS limit, the transmit power is also higher, as each eNB transmits at its maximum power of 10 mW as shown in FIG. 7. On the other hand, when the happiness factor is applied while taking into account the QoS requirement, significant power saving can be achieved. In the case where $\lambda_k=0.01$, the utility reduces by about 8% compared to the case without the QoS limit, while the transmit power is lowered by more than 80%. A smaller reduction in utility, but with a correspondingly smaller reduction in transmit power, can be achieved by setting a higher, more conservative, scaling factor. This reduction in transmit power can be attributed not only to the reduced bit rate requirement, but also the lowering of the overall interference. This shows that significant power savings can be achieved.

As mentioned above, the scaling factor $\lambda_k$ controls the "conservativeness" of the utility, in such way that a higher value improves the overall utility of the system at the expense of a higher transmit power. Thus, this parameter provides a degree of freedom to tune the utility level of the system via the trade-off between utility and power consumption.

For example, the scaling factor can be adjusted based on the current transmit power. If the current transmit power reaches its maximum value, the system performance is not likely to be increasing. On the other hand, by decreasing $\lambda_k$, a small reduction in the overall utility might occur, but there might be a potentially significant reduction in power. Thus, one alternative to the above algorithms is to reduce $\lambda_k$ by a step $\Delta\lambda_k$ if the average power $\overline{P}_k$ is above a certain threshold, and to increase $\lambda_k$ by a step $\Delta\lambda_k$ if the average power is below another threshold.

When the scaling factor $\lambda_k$ is high, more power is used to improve the overall utility within the cell, thereby increasing the level of downlink interference for the neighbours. Thus, another alternative to the above algorithms is to adapt $\lambda_k$ in a cell, based on the level of downlink interference observed at the cell. The interference value can be obtained based on the Evolved UMTS Terrestrial Radio Access (E-UTRA) Carrier Received Signal Strength Indicator (RSSI) using the downlink listen mode (DLM) or mobile measurements. These measurements can be based on the time-average RSSI values, or based on the percentile of the RSSI values. The recommendation to lower the $\lambda_k$ value is then transmitted to the neighbours, for example via a private message in the X2 interface.

As discussed above, the quantity $D_j(k,m)$ describes the level of effects of utility due to the power change from neighbour m at sub-band j. Subsequently, the aggregate impact of the change of utility over all neighbours for sub-band j is given by $$D_j(k) = \sum_m D_j(k, m) \quad (7)$$

The method of computing $D_j(k)$ proposed in Stolyar thus involves the calculation of the rate of change of the utility function with respect to the power. This quantity is then aggregated, as shown by equation (2), and the result is distributed to the neighbours. However, there is no standard interface which allows such a quantity to be passed between base stations (in particular such quantity is not supported by the standard X2 interface), and so the communication of this result requires a proprietary interface between base stations. Therefore, as it might be inconvenient or impossible to provide a proprietary interface, and it is more efficient to use the standard X2 interface if one is available, in order to provide an algorithm that can be used by base stations connected only by the X2 interface, an alternative formulation of the $D_j(k)$ value is used.

According to TS36.423, X2 application protocol (X2AP), V8.3.0, 3GPP, 2008. 0, a Relative Narrowband Tx Power (RNTP) information element (IE) is included in the Load Information X2 message. For each resource block, the RNTP IE informs the neighbouring cells whether the sending cell power at such resource block is above (1), or below (0) a certain threshold (RNTP threshold). In order to be able to use the X2-interface, we need to formulate $D_j(k,m)$ in terms of what are available in X2. The reformulated values for $D_j(k,m)$ can then be exchanged between base stations.

As one example of such a reformulation, let:

$$D_j(k, m) = \begin{cases} -\sum_i \frac{G_i^{(m)}}{G_i^{(k)}} \rho_{j,m} & m \neq k \\ 0 & m = k \end{cases} \quad (8)$$

where $G_i^{(m)}$ is the path gain between the mobile i (served by cell k) and neighbour m, and $\rho_{j,m}$ is the RNTP for sub-band j.

So, mobile devices can make measurements from the neighbouring cells, in order to obtain this information, and can report back to the serving base station. The serving base station can then make the calculations based on equation (8).

The path gain $G_i^{(m)}$ can be obtained at the mobile device by measuring the Reference Signal Reference Power (RSRP) (described in TS 36.214, Physical layer; Measurements, V9.2.0, 3GPP, 2010) and the corresponding transmit power from neighbour m via the neighbour's broadcast channel.

More precisely, let the path gain sampled at time t be:

$$g_i^{(m)}(t) = \frac{RSRP_m(t)}{P_m^{ref}} \quad (9)$$

where $RSRP_m(t)$ is the RSRP from cell m sampled at time t, and $P_m^{ref}$ is the reference signal power from the neighbour's broadcast channel.

As an alternative, $g_i^{(m)}(t)$ can be defined as $g_i^{(m)}(t) = RSRP_m(t)$, as the ratio of the RSRP values would also provide the relative impact of the neighbour base station m with respect to the serving base station.

Note that the RSRP measurements obtained at the mobile or at the base station (using a Downlink Monitor (DLM) in the vicinity of the base station) can fluctuate due to channel fading, shadowing, etc. It is typically more representative to take an average over many samples in order to recover the long-term average of the path gain. Thus, $G_i^{(m)}(t)$ can be obtained as an exponential average: $G_i^{(m)}(t)=(1-\alpha)G_i^{(m)}(t-1)+\alpha g_i^{(m)}(t)$ or more simply as a block average:

$$G_i^{(m)}(t) = \frac{1}{N}\sum_{i=1}^{N} g_i^{(m)}(t-i).$$

Alternatively, $G_i^{(m)}(t)$ can be an x-percentile of the samples $\{g_i^{(m)}(t), t=t-1, t-2, \ldots, t-N\}$.

The quantity $\rho_{j,m}$ can be a reasonable aggregate of the RNTP values for each resource block within a sub-band. A simple solution is $$\rho_{j,m} = \frac{1}{Q}\sum_{q=1}^{Q} \rho_{j,m}^{(q)}, \quad (10)$$

where Q is the number of resource blocks per sub-band, and $\rho_{j,m}^{(q)}$ is the RNTP for resource block q in sub-band j from neighbour m. Another way to aggregate the per-resource block values into a sub-band is to take the maximum value among $\rho_{j,m}^{(q)}$, $\forall q$, for example.

Figure 8:
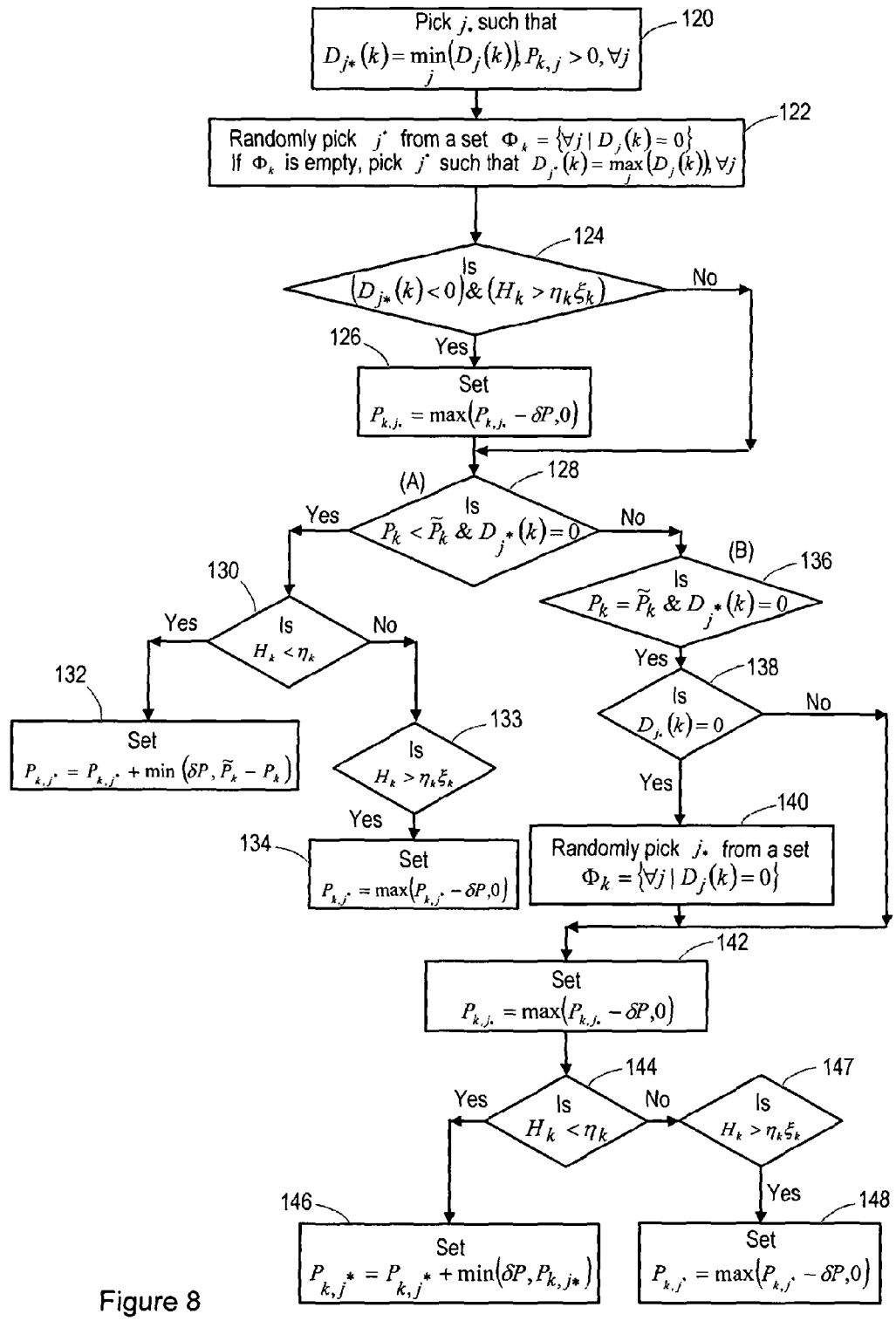
FIG. 8 is a flow chart, illustrating a second method in accordance with the invention.

FIG. 8 is an overall flow diagram of the process, which is repeated periodically. Note that the quantity $D_j(k,m)$ no longer explicitly represents the sensitivity of the utility of cell k at sub-band j with respect to the power from neighbour m. Rather, it represents the aggregate impact among mobiles in cell k due to cell m if cell k were to transmit at sub-band j. The more negative the quantity is, the more impact it has, and, therefore, cell k would further avoid its transmission at the respective sub-band.

It is important to note that the formulation of $D_j(k,m)$ in equation (8) above assumes that the mobiles have the capability of measuring the broadcast channel, and obtain the transmit power of the neighbour, as well as the direct measurement of RSRP of the same neighbour. A simplified way to compute $D_j(k,m)$ is given by $$D_j(k, m) = \begin{cases} -\frac{G^{(m)}}{G_k} \rho_{j,m} & m \neq k \\ 0 & m = k \end{cases}, \quad (11)$$

where $G^{(m)}$ is the path gain between the DLM which resides at the vicinity of the base station for cell k and the corresponding transmitter at the base station in cell m, and $G_k$ is some positive constant.

In the formulation in equation (11), a larger value of $D_j(k,m)$ is a value that is closer to zero. If the path gain of the neighbour at j is large, and the neighbour is transmitting at higher power as indicated by $\rho_{j,m}$, then the ratio takes on a large value, and the negative sign in front of that would make this quantity more negative, and further away from zero. The more negative this quantity is, the more detrimental this sub-band j would be for transmission. Thus, the sensitivity and therefore the risk are higher if the serving base station were to transmit at sub-band j If no mobile reporting information is available, allowing the path gain between the served mobile and the neighbours to be calculated, the serving base station can still rely on its Downlink Monitor (DLM), where it detects signals transmitted by neighbouring base stations on system downlink frequencies, to do the estimation of the path gain (between its DLM and the neighbour). In other words, the DLM acts like a user for the purpose of path gain estimation. Of course, this would not be as representative as obtaining information from the mobile users, as the mobile users are in different locations within the cell.

Finally, if no DLM information is available, then the base station would have to rely on the information that the X2 interface provides, namely the $\rho_{j,m}$ value, and so $D_j(k,m)$ could be defined as:

$$D_j(k, m) = \begin{cases} -\rho_{j,m} & m \neq k \\ 0 & m = k \end{cases}. \quad (12)$$

Thus, the X2-compliant version of the algorithm reformulates $D_j(k)$ in such a way that it makes use of data that can be made available in the X2 interface between two eNBs. As examples, $D_j(k)$ can be redefined as shown in equations (8), (11), or (12) above.

As a result of the redefinition, some modifications of the original algorithm are made in order to make the algorithm more stable and robust.

Thus, in FIG. 8, in step 120, a sub-band index j is picked, such that $D_{j*}(k)$ is the smallest among all j's, given that $D_j(k)<0$ and $P_{k,j}>0$. Thus, this step selects the sub-band for which a power increase would have the lowest, or least beneficial, effect on the cell performance, and it is this sub-band whose power might be reduced later.

In step 122, a sub-band index j* is picked, the intention being to select the sub-band for which a power increase would have the greatest, or most beneficial, effect on the cell performance. As shown by equations (7) and (11), in the best sub-band $D_j(k)$ would have a value of zero, and it is possible that there would be multiple sub-bands which would satisfy this criterion. In order to avoid the possibility that the power is increased in only one sub-band, the sub-band in which power might be increased later is chosen randomly from a set of sub-bands having $D_j(k)=0$. In this way, potentially more sub-bands can take on non-zero power, and the sub-band utilization increases.

In step 124, it is tested whether $D_{j*}(k)<0$. As the sub-band index j* has been picked such that $D_{j*}(k)$ is the smallest among all j's, step 124 tests in effect whether there is any sub-band having a negative value for $D_{j*}(k)$. That is, step 124 tests whether there exists any sub-band for which a power increase would have a non-beneficial effect.

In step 124, it may also be tested whether the cell is happy. This is determined by testing whether the true happiness $H_k$ is greater than the product of a Quality of Service (QoS) requirement $\eta_k$ and a hysteresis factor $\xi_k$, i.e. it is tested whether $H_k>\eta_k\xi_k$. The value of the QoS requirement may, for example, be set to a value of 1.

If it is found in step 124 that $D_{j*}(k)<0$ and, where it is also tested whether the cell is happy, also that $H_k>\eta_k\xi_k$, the process passes to step 126, in which the power is reduced in the sub-band index j*. Specifically, the power is reduced by a decrement value $\delta P$ from its current value $P_{k,j*}$, although of course it cannot be reduced below zero.

After completing step 126, or if it is found in step 124 that there is no sub-band for which a power increase would have a non-beneficial effect and/or that the true happiness $H_k$ is not greater than the product of a Quality of Service (QoS) requirement $\eta_k$ and a hysteresis factor $\xi_k$, the process passes to step 128.

In step 128, it is determined whether the total transmit power for the cell $P_k$ is less than the maximum allowed total power $\tilde{P}_k$, and simultaneously whether it is beneficial for the power to be increased in the sub-band selected in step 122, i.e. whether $D_{j*}(k)=0$.

If both of these conditions are met, the process passes to step 130, in which it is tested whether the cell is happy. This is determined by testing whether the true happiness is less than the QoS requirement $\eta_k$, i.e. whether $H_k<\eta_k$. Where the QoS requirement is set at a value of 1, this is determined by testing whether the true happiness is less than unity, i.e. whether $H_k<1$. If this condition is met, then it is determined that the cell is not happy enough, and the process passes to step 132, in which the power is increased in the sub-band selected in step 122. Specifically, the power is increased by an increment value $\delta P$ from its current value $P_{k,j*}$, or by the maximum increment that can be applied without increasing the total power of the cell beyond the maximum allowed total power $\tilde{P}_k$, if the latter increment is smaller. That is, step 132 sets $P_{k,j*}=P_{k,j*}+\min(\delta P,\tilde{P}_k-P_k)$.

If it is determined in step 130 that the cell is happy enough, i.e. that $H_k \geq \eta_k$ (or, where the QoS requirement is set at a value of 1, that $H_k \geq 1$), the process passes to step 133, in which it is determined whether the true happiness $H_k$ is greater than the product of the QoS requirement $\eta_k$ and the hysteresis factor $\xi_k$, i.e. it is determined whether $H_k>\eta_k\xi_k$. Where the QoS requirement is set at a value of 1, it is actually determined whether the true happiness $H_k$ is greater than the hysteresis factor $\xi_k$, i.e. it is determined whether $H_k>\xi_k$.

If it is determined in step 133 that the true happiness is more than sufficient, i.e. that $H_k>\eta_k\xi_k$ (or, where the QoS requirement is set at a value of 1, that $H_k>\xi_k$), the power is reduced, in order to save energy and increase efficiency. Specifically, the power is reduced by a decrement value $\delta P$ from its current value $P_{k,j*}$, although of course it cannot be reduced below zero. Thus, step 134 sets $P_{k,j*}=\max(P_{k,j*}-\delta P, 0)$.

If it was determined in step 128 that the maximum total power for the cell is already being used, or that it is not beneficial for the best sub-band to increase power, the process passes to step 136, in which it is determined whether the total transmit power for the cell $P_k$ is equal to the maximum allowed total power $\tilde{P}_k$, and simultaneously whether it is beneficial for the power to be increased in the sub-band selected in step 122, i.e. whether $D_{j*}(k)=0$. If these conditions are not met, the algorithm stops and waits until the next execution begins. However, if these conditions are met, it suggests that it is still worthwhile to do further power adjustments.

As the total transmit power for the cell is already at the maximum allowed total power, the adjustments require a sub-band in which the power can be decreased. Thus, it is tested in step 138 whether $D_{j*}(k)=0$, i.e. whether the power can beneficially be increased even in the sub-band with the lowest value of $D_{j*}(k)$. If this condition is met, the process passes to step 140.

In step 140, a new sub-band is selected randomly from the set of sub-bands having $D_j(k)=0$, and the process then passes to step 142.

Alternatively, if it found in step 138 that the sub-band with the lowest value of $D_{j*}(k)$ has $D_{j*}(k) \neq 0$, or more specifically has $D_{j_*}(k)<0$, i.e. that the power can beneficially be decreased in this sub-band, the process passes directly to step 142.

In step 142, the power is decreased in the sub-band found in step 138 to have the lowest negative value of $D_{j_*}(k)$, or the sub-band selected in step 140. Specifically, the power is reduced by a decrement value $\delta P$ from its current value $P_{k,j_*}$, although of course it cannot be reduced below zero. Thus, step 142 sets $P_{k,j_*}=\max(P_{k,j_*}-\delta P, 0)$.

It is then determined whether it is advantageous to increase the power in one of the sub-bands, by reallocating the power that was removed from one of the sub-bands in step 142. Specifically, in step 144, it is tested whether the cell is happy. This is determined by testing whether the true happiness is less than unity, i.e. whether $H_k<1$. If this condition is met, then it is determined that the cell is not happy enough, and the process passes to step 146, in which the power is increased in the sub-band selected in step 122, namely the sub-band in which the increase in power has the greatest beneficial effect. Specifically, the power is increased by the amount by which the power in the sub-band $j_*$ was decreased in step 142. Thus, the power is increased by the increment value $\delta P$ from its current value $P_{k,j^*}$, or by the previous power in the sub-band j if the latter amount is smaller. That is, step 146 sets $P_{k,j^*}=P_{k,j^*}+\min(\delta P, P_{k,j_*})$.

If it is determined in step 144 that the cell is happy enough, i.e. that $H_k \geq \eta_k$ (or, where the QoS requirement is set at a value of 1, that $H_k \geq 1$), the process passes to step 147, in which it is determined whether the true happiness $H_k$ is greater than the product of the QoS requirement $\eta_k$ and the hysteresis factor $\xi_k$, i.e. it is determined whether $H_k > \eta_k \xi_k$. Where the QoS requirement is set at a value of 1, it is actually determined whether the true happiness $H_k$ is greater than the hysteresis factor $\xi_k$, i.e. it is determined whether $H_k > \xi_k$.

If it is determined in step 147 that the true happiness is more than sufficient, i.e. that $H_k > \eta_k \xi_k$ (or, where the QoS requirement is set at a value of 1, that $H_k > \xi_k$), the power is reduced, in order to save energy and increase efficiency. Specifically, the power is reduced by a decrement value $\delta P$ from its current value $P_{k,j^*}$, although of course it cannot be reduced below zero. Thus, step 148 sets $P_{k,j^*}=\max(P_{k,j^*}-\delta P, 0)$.

Thus, the combined effect of steps 140, 142 and 146 is to reduce the power in a good sub-band, and increase it in another good sub-band. This creates an opportunity for the system to redistribute power among sub-bands, and to randomize and diversify the power allocated to the sub-bands in order to avoid falling into local maxima.

One alternative to the algorithm shown in FIG. 8 is to replace decision blocks 128 and 136 by a single decision as to whether the total transmit power for the cell is less than the maximum allowed total power cell, i.e. whether $P_k < \tilde{P}_k$. In this way, the power increase does not necessarily have to wait until a sub-band is completely interference free, and the base station may increase the power at the sub-band with the least interference.

Another alternative, which provides a slight generalization of the algorithm in FIG. 8 is to replace the selection in step 120 by a random selection of $j_*$. That is, $j_*$ can be randomly selected from the set $\Omega_k$, where $\Omega_k=\{(1), (2), \ldots, (M_k)\}$, with $1 \leq M_k \leq J$ and (j) being the index corresponding to the i-th smallest value of $D_j(k)$, i.e. $D_{(1)}(k) \leq D_{(2)}(k) \leq \ldots \leq D_{(J)}(k)$. When $M_k=1$, this reduces to the original step 120 in FIG. 8. The purpose of this generalization is to randomize and diversify the selection of j* in order to further improve the optimization results.

Figure 9:
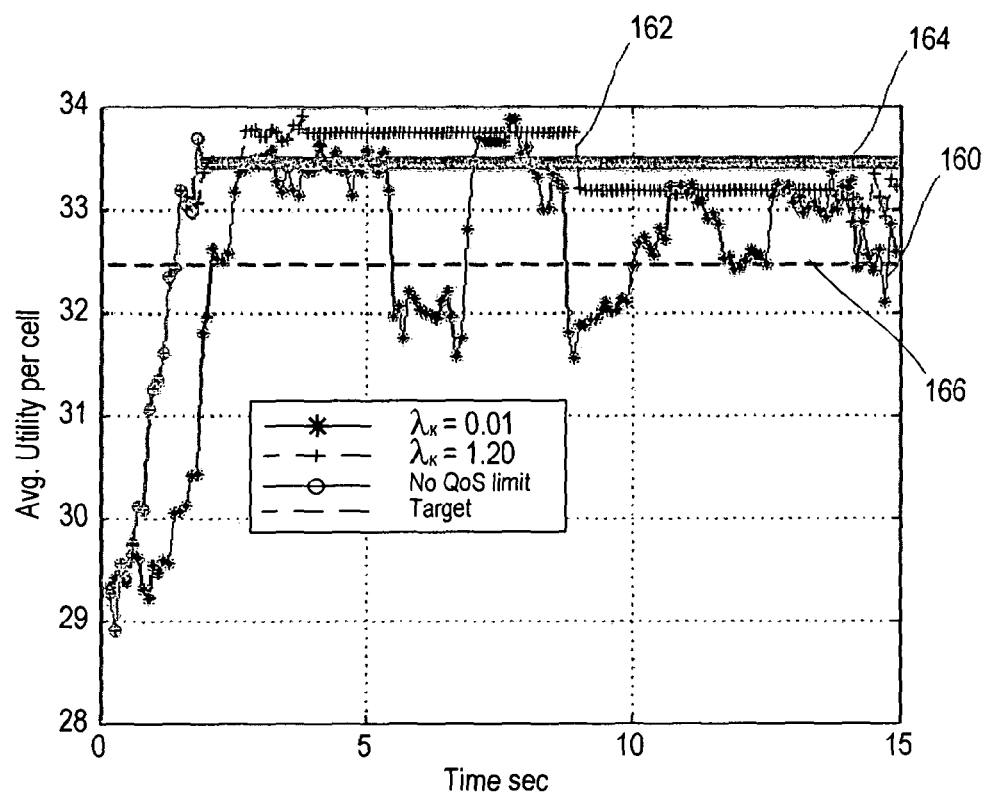
FIG. 9 illustrates a change in utility over time, for various values of a scaling factor.

FIG. 9 shows the average utility per cell as a function of time, when choosing different values for the scaling factor $\lambda_k=0.01$ (line 160 in FIG. 9) and $\lambda_k=1.20$ (line 162 in FIG. 9) at a target transport block size (TBS) of 90 bytes per Transmission Time Interval (TTI). For comparison purposes, the result for the case without QoS requirement (line 164 in FIG. 9) is also included. Similarly to FIG. 6 above, the average utility per cell converges to the target (line 166 in FIG. 9), provided that it is feasible. However, the convergent time is slightly longer, especially for the case of $\lambda_k=0.01$.

Figure 10:
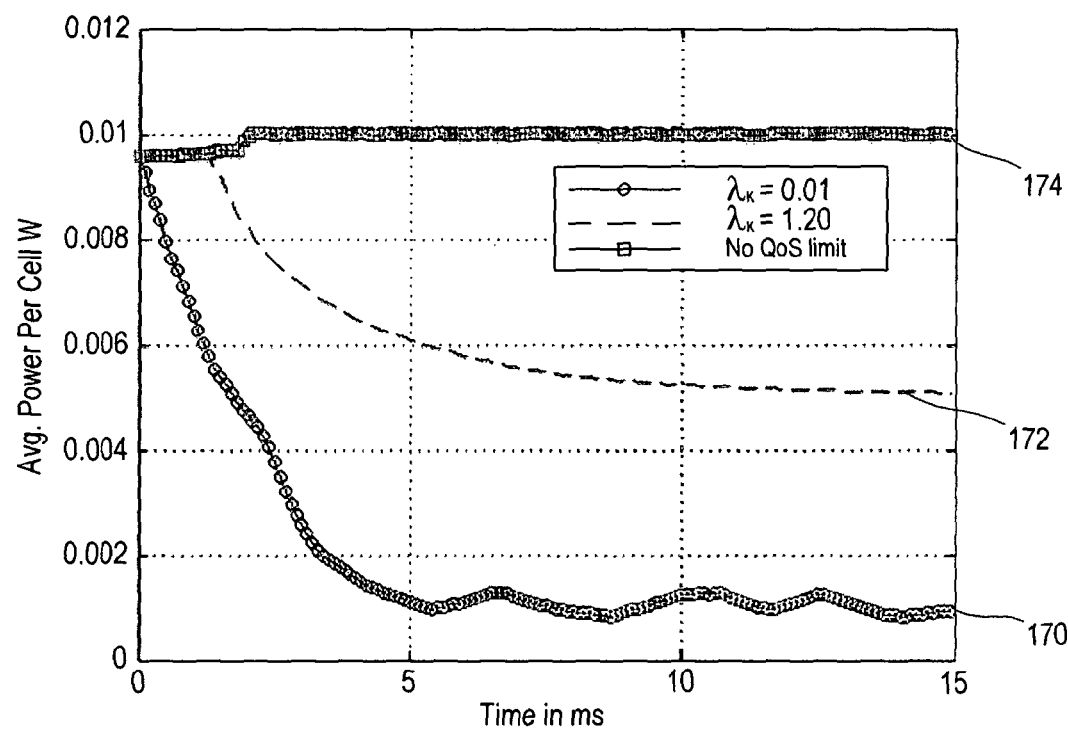
FIG. 10 illustrates a change in power over time, for various values of the scaling factor.

FIG. 10 illustrates the effect on the average power per cell of choosing different values for the scaling factor $\lambda_k$. Specifically, FIG. 10 shows the average power per cell as a function of time for $\lambda_k=0.01$ (line 170 in FIG. 10) and $\lambda_k=1.20$ (line 172 in FIG. 10). For comparison purposes, the result for the case without QoS requirement (line 174 in FIG. 10) is also included. Thus, the power efficiency is again very high for a reasonable bit rate target.

As described above, the scaling factor can be adjusted based on the current transmit power, or based on the observed level of downlink interference.

It can be seen that the gap between the aggregate QoS limit among the supporting mobiles and the cell capacity defines the energy efficiency of the cell. In other words, when the aggregate QoS limit is higher than the cell capacity, full power would be used, and no power saving is possible. However, by bringing the QoS limit down to and slightly below the cell capacity, power saving starts to become possible.

One further proposal to achieve energy saving is to adaptively lower the QoS limit by observing the cell throughput dynamics.

In order to obtain the sensitivity $D_j(k,m)$ as described above, we need to compute the derivative of the cell utility with respect to the transmit power in cell m at sub-band j. Typically, the cell utility is related to the spectral efficiency of the sub-bands. For example, let $$D_j(m,k) = \frac{\partial U_k}{\partial P_{m,j}} \qquad (13)$$

$$\approx \sum_{i \in \Omega_k} f\left(\frac{\partial \omega(\gamma_{i,j}^{(k)})}{\partial P_{m,j}}\right)$$

$$= \sum_{i \in \Omega_k} f\left(\frac{\partial \omega(\gamma_{i,j}^{(k)})}{\partial \gamma_{i,j}^{(k)}} \cdot \frac{\partial \gamma_{i,j}^{(k)}}{\partial P_{m,j}}\right)$$

where $\Omega_k$ is the set of user indices in cell k, $\gamma_{i,j}^{(k)}$ is the Signal-to-Interference and Noise Ratio (SINR) of user i in cell k at sub-band j, and $\omega$ is the spectral efficiency which is a function of $\gamma_{i,j}^{(k)}$. The term $f(.)$ is a pre-defined function which defines $D_j(k,m)$, and, therefore, is known to the base station. The quantity $\partial \gamma_{i,j}^{(k)}/\partial P_{m,j}$ is relatively straight-forward, as $\gamma_{i,j}^{(k)}$ is a well-known function of $P_{m,j}$. The main issue is the quantity $\partial \omega(\gamma_{i,j}^{(k)})/\partial \gamma_{i,j}^{(k)}$, which depends on the nature of $\omega$, and is not known exactly in practice. Typically, it is often assumed that $$\omega(x) = \log_2\left(1 + \frac{x}{\Gamma}\right), \qquad (14)$$

where $\hat{\Gamma}$ is a fixed value often known as the "capacity-gap" constant, as it determines how far it is from the actual channel capacity. For simplicity, $\hat{\Gamma}=1$ is assumed in the prior art document R. Kwan, C. Leung, "A Survey of Scheduling and Interference Mitigation in LTE", Volume 2010, Article ID 273486, while $\hat{\Gamma}=-\log(5\epsilon_b)/1.5$, (where $\epsilon_b$ is the bit error rate) is assumed in other prior art documents, such as A. J. Goldsmith, S-G Chua, "Variable-Rate Variable-Power MQAM for Fading Channels", *IEEE trans. on Comm.* Vol. 45, no. 10, October 1997; G. Piro, N. Baldo. M. Miozzo, "An LTE module for the ns-3 network simulator", in Proc. of Wns3 2011 (in conjunction with SimuTOOLS 2011), March 2011, Barcelona (Spain); and H. Seo, B. G. Lee. "A proportional-fair power allocation scheme for fair and efficient multiuser OFDM systems", in Proc. of IEEE GLOBECOM, December 2004. Dallas (USA).

It is important to note that the analytical relationship described in equation (14) above is only theoretical, as the actual SINR is not known to the base station. According to 3GPP TS 36.213, Physical layer procedures, Release 9, v9.3.0, the mobile measures the downlink channel quality in the form of an SINR, and packages such a quantity in a form of an index known as the Channel Quality Indicator (CQI). It is the CQI that is available to the receiving base station.

Also, equation (14) defines a static relationship which, even if it is a good approximation in a certain environment, may not be as accurate in another. In practice, the spectral efficiency vs channel quality relationship dependency would likely be different due to vendor-specific implementation of the receiver structures. Thus, a more robust way of relating $\omega$ to $\gamma_{i,j}^{(k)}$ would be extremely useful.

According to 3GPP TS 36.213, Physical layer procedures, Release 9, v9.3.0, there is a definite relationship between the spectral efficiency and the reported CQI from the mobile. In other words, once the CQI is known, the base station can obtain the spectral efficiency corresponding to each CQI report via a look-up table. While an explicit analytical relationship between spectral efficiency and CQI is not given, we propose to approximate the spectral efficiency fairly reasonably as a power function of the CQI:

$$\omega = aq^b \qquad (15)$$

where q is the CQI, a=0.077, and b=1.586.

While the relationship between spectral efficiency and CQI is fixed, the way CQI is measured is not standardized, although it most likely depends on the measured SINR. The way SINR is measured is vendor-specific, and depends on a number of factors, including the implementation of receiver algorithms involved, the accuracy of the estimation, etc. However, in practice, the CQI is designed in such a way that it is fairly linear as a function of the SINR in dB. Each point at a given CQI value in such a linear relationship lies in a similar distance from its neighbour. Despite the possible diversity of vendor-specific implementations, such relationships are not expected to deviate much from each other, as there are only a limited number of reasonable ways of designing a good receiver given a standardized algorithm at the transmitter side. A good example of the relationship between CQI and SINR can be found in the prior art document C. Mehlführer, M. Wrulich, J. C. Ikuno, D. Bosanska, M. Rupp, "Simulating the Long Term Evolution Physical Layer", Proc. of 17$^{th}$ European Signal Processing Conference (EUSIPCO), 2009.

An empirical approximation of such a relationship is:

$$q = c\gamma_{dB} + d \qquad (16)$$

where $\gamma_{dB}$ is the SINR expressed in decibels (and, hence $\gamma_{dB}=10\cdot\log_{10}\gamma$, where $\gamma$ is the SINR), c=0.5, and d=4.4. Thus, the spectral efficiency as a function of the SINR is then given by $$\omega = a(c' \log_{10}(\gamma)+d)^b \qquad (17)$$

where c'=10c.

As mentioned earlier, the CQI vs SINR curve is not standardized, and slight implementation differences may exist between vendors. Despite this, it is possible to compensate for such differences by introducing an offset $\Delta d$ to equation (17) such that $$\omega = a(c' \log_{10}(\gamma)+d+\Delta d)^b. \qquad (18)$$

Equation (18) lends itself to a simple form which is continuously differentiable, and the derivative itself is relatively simple.

Figure 11:
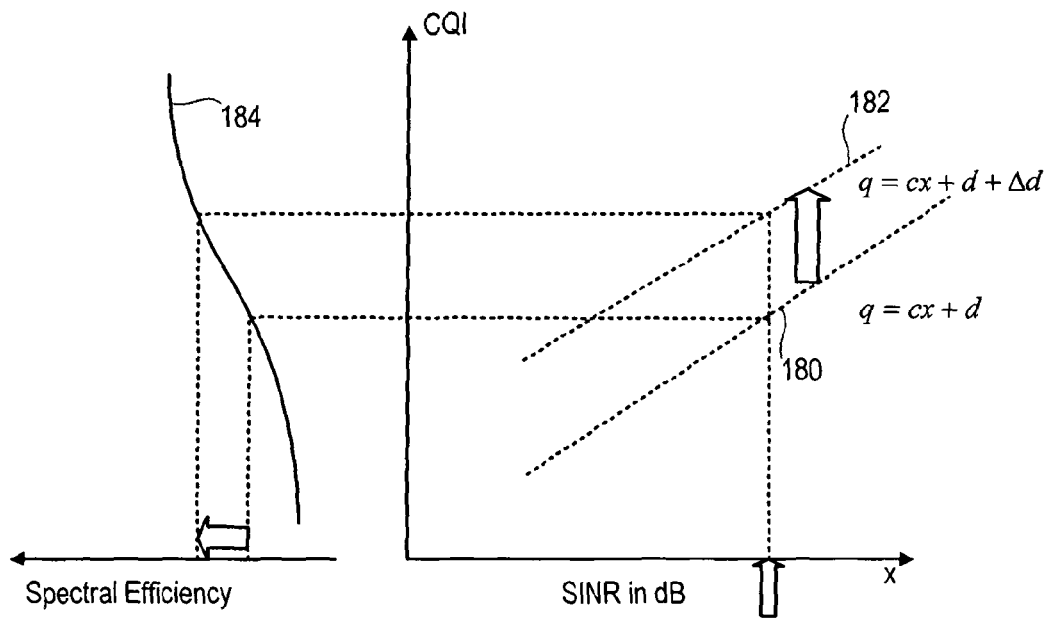
FIG. 11 illustrates a relationship between Signal to Interference and Noise Ratio, a Channel Quality Indicator, and spectral efficiency.

FIG. 11 shows the adjustment of the relationship between spectral efficiency $\omega$ and SINR via the CQI offset $\Delta d$. Specifically, introducing a positive offset $\Delta d$ shifts the CQI against SINR relationship from that indicated by line 180 to that indicated by line 182, and so means that, for a given measured SINR value, a higher value of CQI is obtained. This then means that a point higher up the spectral efficiency against CQI curve 184 is selected, and hence a higher value for the spectral efficiency $\omega$. Note that, from the point of view of computing $D_j(m,k)$, the offset $\Delta d$ does not necessarily need to be quantized, as the main aim is to obtain an analytical approximation to the spectral efficiency $\omega$ so that the derivative with respect to the SINR can be computed.

FIG. 12 shows the effect of CQI adjustment by means of offset $\Delta d$. As an example, FIG. 12(*a*) shows the effect of introducing an offset of $\Delta d=-2$, namely that the original CQI line 190 (based on the results obtained in the prior art document C. Mehlführer, M. Wrulich, J. C. Ikuno, D. Bosanska, M. Rupp, "Simulating the Long Term Evolution Physical Layer", Proc. of 17$^{th}$ European Signal Processing Conference (EUSIPCO), 2009) is shifted vertically downward to the line 192. That is a lower CQI value is obtained for any given SINR value.

FIG. 12(*b*) then shows that, by shifting of the CQI value, the original spectral efficiency curve produced by Vienna University of Technology (VUT) in the Mehlführer et al prior art document (line 194 in FIG. 12(*b*)) is shifted to produce lower values for the spectral efficiency, and the resulting curve (line 196 in FIG. 12(*b*)) matches the spectral efficiency curve (line 198 in FIG. 12(*b*)) produced independently by Centre Tecnològic de Telecommunicacions de Catalunya (CTTC) based on the assumption in the prior art document G. Piro, N. Baldo. M. Miozzo, "An LTE module for the ns-3 network simulator", in Proc. of Wns3 2011 (in conjunction with SimuTOOLS 2011), March 2011, Barcelona (Spain).

One way to determine the value of $\Delta d$ is via the Hybrid ARQ feedback. If the ratio of the number of Negative ACKnowledgement (NACK) messages to the total number of transmissions (including retransmissions) is larger than a certain threshold over a certain period of time, $\Delta d$ is decremented by one. On the other hand, if this ratio is lower than a certain threshold over a certain time period, $\Delta d$ is incremented by one.

Thus, if there are a high proportion of NACK messages, this means that the channel quality is lower than previously thought, and so the offset value is decremented, which means that the derived value of CQI is reduced. A lower value of CQI means it is more "conservative", and less error-prone.

Thus, this provides a way to obtain an empirical, analytically simple relationship between the spectral efficiency and the SINR. This is important as CQI is the only information available to the base station according to the standard. Such a relationship can then be used to obtain the sensitivity function for the above-described power management mechanism. This generic relationship provides a way to adapt itself to some true underlying relationship via a simple adjustment of parameter.

Hybriad ARQ feedback can then be used to adjust the parameter such that the estimated relationship better matches the true underlying relationship. As alternatives to HARQ feedback, it is possible to use the difference between average block error rate and the respective target value, i.e. X=avg BLER target BLER. If X is above zero (or, even better, a small positive threshold) over a period of time T, the offset is reduced by one unit. On the other hand, if X is below zero (or, a small negative threshold) over a period of time T, the offset is increased by one unit.

Note that the above methods require a dedicated interface between two nodes, so that the nodes can communicate the information required for setting power values as discussed above. FIG. 13 illustrates a possible deployment, with a femto layer 220 comprising multiple HeNB's 222a, 222b, ..., 222k, and a macro layer 224 comprising multiple eNB's 226a, 226b, ..., 226k. Within the femto layer 220, it may be reasonable to assume that all HeNBs can communicate with each other via the X2 interface. This is especially like to happen in what is known as the "enterprise" environment, where all HeNBs are likely from the same vendor. In the macro layer 224, all eNBs are also expected to be able to communicate with each other via the X2 interface. However, it may not be always possible to have an X2 interface between the femto layer 220 and macro layer 224.

Another relevant aspect of the deployment, in a network of the type shown in FIG. 13, is the way that the spectrum is overlapped between the macro and femto layers. FIG. 14 shows three different possibilities, illustrating schematically how the available frequency band is divided between the macro and femto layers.

A first possibility, case A, is that sub-bands 230 are allocated to the macro layer and sub-bands 232 are allocated to the femto layer, so there is no frequency overlap between the two layers. Thus, there is no need to perform interference mitigation between the two layers, as the frequency bands involved are not co-channel.

A second possibility, case B, is that sub-bands 234 are allocated to the macro layer and sub-bands 236 are allocated to the femto layer, so that the frequency band of the femto layer is completely overlapped by that of the macro layer. Thus, while the non-overlapped region of the macro layer is not affected, the impact on the overlapped region could potentially be significant. In this case, interference management becomes very useful.

The intermediate possibility, case C, is that sub-bands 238 are allocated to the macro layer and sub-bands 240 are allocated to the femto layer, and there is a partial overlap between the macro and femto layers. The schedulers of the base stations in the respective layers are expected to select sub-bands automatically so as to avoid the inter-cell interference, and the relationship between sub-bands in the two layers can be mapped using their respective Evolved UMTS Terrestrial Radio Access (E-UTRA) Absolute Radio Frequency Channel Numbers (EARFCN) and bandwidths, which can be exchanged via the X2 interface. However, by incorporating the power management whereby lower power is allocated to sub-bands of higher interference and vice versa, higher performance can still be expected.

Below are set out the possible deployment scenarios allowing communication between the various base stations, in the case of the first method described above and shown in FIG. 5, in which power management relies on the setting of the power values in accordance with the calculated happiness values, requiring a proprietary interface between base stations, and in the case of the second method described above and shown in FIG. 8, in which power management depends on quantities that can be transmitted over the standard X2 interface.

Base Stations in Femto Layer Only
Method Requiring Proprietary Interface Between Base Stations This is applicable when the HeNBs within a geographic region belong to the same vendor or vendors with a certain special arrangement. This is likely to happen in an "enterprise" environment, in which femtocells collectively share a space, where mobile users are expected to roam freely. In this case, it is possible to define a proprietary message as the "private message" over the X2.
Method Able to Use X2 Interface In this scenario, HeNBs can use a standard X2 interface for the purpose of power adaptation. The standard X2-based version does not require the use of private message in the X2 interface. It is not uncommon that the HeNBs in the service area would belong to the same vendor (or different vendors sharing a certain arrangement). However, if two base stations do not belong to the same vendor, the HeNB implementing the algorithm can still benefit from the standard message from its neighbour. Thus, this solution is less sensitive to issues of compatibility among base stations, as long as they share the standard X2 interface.
Base Stations in Macro Layer Only
Method Requiring Proprietary Interface Between Base Stations The neighbouring macro base stations may come from different vendors, but this method would only be applicable in the case of base stations from the same vendor.
Method Able to Use X2 Interface This solution does not require a proprietary interface. Therefore, as in the case above where the base stations are in the femto layer only, the X2 interface can be used without requiring the use of a private message.
Base Stations in Femto and Macro Layers, and X2 Interface Available Between them Method Requiring Proprietary Interface Between Base Stations Due to the expectation that a large number of femto cells reside under a single macro area, it is likely to be more convenient for each HeNB to perform power adaptation than for the macrolayer base station to attempt to set a power that is appropriate for every femtocell. If only the HeNBs are doing the adaptation, there is no need for the power setting algorithm to run at the macro layer base station (at least not to adapt to the power levels in the femto layer). Thus, there is no vendor compatibility issue for the macro layer base stations.
Method Able to Use X2 Interface Again, each HeNB can perform power adaptation, and there is no need for the power setting algorithm to run at the macro layer base station.

The method shown in, and described with reference to, FIG. 8 applies, using the available X2 interface between the macro and femto layers. The required information can be embedded in the Relative Narrowband Tx Power (RNTP) information element (IE) in the Load Information X2 message. For each resource block, the RNTP IE informs the neighbouring cells whether the sending cell power at such resource block is above (1), or below (0) a certain threshold (RNTP threshold), which is another X2 parameter in the 3GPP specification. Depending on the flavour of the algorithm, mobile measurements may be required to compute the path gain relative to the base station. This can be achieved by comparing the mobile downlink RSRP measurement with the Reference Signal Transmit Power of the system information block (SIB) from the broadcast channel of the neighbour cell. If proprietary information is needed, the Private Message in the X2 interface can be used.

Base Stations in Femto and Macro Layers, and No X2 Interface Available Between them When no X2 interface is available, it is difficult to estimate the effect of the interference due to a specific neighbouring macro on a frequency-unit by frequency-unit basis. Thus, the effect of inter-cell interference would have to be estimated indirectly.

For example, one way to estimate the inter-cell interference without the use of an X2 interface is to configure and use periodic mobile CQI measurements across the entire bandwidth.

Firstly, the base station collects these CQI measurements from all camped mobiles. These CQI measurements are considered instantaneous on a sub-frame level, and so, to estimate the inter-cell interference over the long term, the base station then performs an averaging of these measurements, which can for example be based on an exponential average or block average, etc.

Since the mobiles are at different geographic locations, their path gains relative to the respective base stations are different. Thus, the average CQI measurements from each mobile are then normalized with respect to its respective mean value.

The serving base station then gathers the normalized average CQI measurements from all mobiles belonging to it, and does an averaging of CQI among all mobiles for each sub-band across the entire bandwidth, resulting in a vector of cell-wise normalized average CQI measurements $\bar{\phi}_k=(\phi_{k,1},\phi_{k,2},\ldots,\phi_{k,j},\ldots,\phi_{k,J})$ where j corresponds to the index of a sub-band.

For each entry j of $\bar{\phi}_k$ that is below a certain threshold $\tilde{\phi}_k$, the quantity $D_j(k)$ can be set to a negative real value. For example, $D_j(k)$ can be: (a) a fixed negative real value; (b) a value picked from a uniform distribution U(−a, −b), where a and b are some positive real values; (c) the value $\phi_{k,j}-\tilde{\phi}_k$; (d) the negative of the largest sum of the path gain ratio between a neighbour relative to all mobiles attached to the serving base station (e.g. similar to equation (8) above); or (e) a version of (d) which involves only the downlink listen mode (DLM), instead of relying on mobile measurements (i.e. similar to equation (11) above).

Once this is done, the algorithm shown in FIG. 8 can then be applied.

It should be noted that frequency selectivity may affect the accuracy of the above estimation. That is, the wireless channel can be expected to vary to some extent across the frequency band. Thus, it is expected that the estimation will typically be more accurate in a femtocell environment, as the delay spread is typically smaller. However, the method of estimation is not limited to the femtocell environment.

For the case when X2 is not present between the macro and femto layers, but is present within the femto layer, the set of sub-band indices for which $D_j(k)$ is set should be the union between the set obtained from the X2 interface and that using mobile measurements. The value of $D_j(k)$ can for example be obtained using the path gain measurements as set out in options (d) or (e) above, or variations thereof.

It was discussed above that a "happiness factor" can be defined as the average bit rate achieved by a user divided by the bit rate requirement, $\tilde{R}_{k,i}$. If this bit rate requirement is very high relative to the capacity of the system to handle such a requirement, the system would inevitably attempt to use as much power as possible to fulfil the requirement.

FIG. 15 shows how the average utility function $\bar{U}_k$ and the average power $\bar{P}_k$ vary with the bit rate requirement, per mobile, i.e. $\tilde{R}_{k,i}$. When the "capacity" $C_{k,sys}$ of the system is below the requirement, there is very little gain in using the full power as the performance itself is limited by the inherent limit of the system. Here, the term "capacity" is defined loosely as the maximum performance that the system can achieve given the bandwidth, the locations of the mobiles, etc. On the other hand, as the bit rate requirement approaches and goes slightly below the system capacity, the room for power saving starts to appear, and the power efficiency starts to improve. As the required bit rate reduces below the system capacity, it becomes possible for the system to reduce the transmit power at the expense of a small bit rate degradation. However, due to the reduction of inter-cell interference, the reduction of the bit rate due to the lowering of power can then be compensated by the increase in the SINR. Also, the impact of bit rate reduction is further absorbed by the logarithmic relationship of the utility with respect to the bit rate.

FIG. 16 shows the relationship between the average utility function $\bar{U}_k$ and the average power $\bar{P}_k$, with points on the line 250 representing the relationship for different values of the bit rate requirement per mobile, i.e. $\tilde{R}_{k,j^*}$. As the required bit rate reduces, the state of the system moves towards the left from point A. It can therefore be seen that the bit rate requirement $\tilde{R}_{k,i}$ can be set to a value (for example in the region 252 on the line 250) that achieves significant power savings, compared with the highest power requirements, but without incurring large penalties in terms of the reduction in utility.

Typically, the required bit rate is controlled by the higher layers of the network. However, one possibility is for the base station to set the bit rate requirements to lower values as follows:

Firstly, take N consecutive samples of the happiness $H_{k,i}$. If $H_{k,i}<1$ occurs for at least N' (where N'≤N) consecutive samples, and the system is transmitting at full power, $\tilde{R}_{k,i}$ is reduced by a step value $\Delta\tilde{R}_{k,i}$. This adjustment process takes places very slowly, because the values of N and N' are relatively large compared to the frequency at which the power setting algorithm is invoked.

This can be repeated until $\tilde{R}_{k,i}$ has been reduced to the lowest tolerable value, or until the reduction in the required bit rate means that the utility is decreasing faster than the average power. So, for example, it can be that the process will repeat itself until 1) the rate of change of the average cell utility with respect to the average cell power (the derivative for short) is above a certain threshold or 2) the average cell utility is below a certain utility threshold, or 3) a sub-set of users' utilities are above a certain threshold. As shown in FIG. 16, the derivative is positive. As the bit rate requirement reduces to a certain level, the value of the derivative starts to increase very rapidly. The system therefore keeps track of such derivative as the bit rate requirement is reduced and, as condition 1), 2), or 3) is met, the reduction of the bit rate requirement stops.

A minimum tolerable bit rate can be associated with each bit rate requirement set by a mobile. As one example, this lowest tolerable value might be set to a predetermined fraction of the initial bit rate requirement. The predetermined fraction might be set to be a constant value, such as ½ or ¾. Alternatively, the predetermined value might be set based on the traffic type. Thus, the predetermined value might be set to ½ for certain sorts of traffic and to ¾ for certain other sorts of traffic. The lowest tolerable value should always be set such that it protects user i from service shut-down.

As described above, the happiness of a user is defined as the average bit rate divided by the bit rate requirement for the user. Thus, as the bit rate requirement is reduced, the user would appear to be more happy. When the user's happiness improves, there is a less frequent need for the system to increase the power during the power adaptation. This causes the average power to reduce. As the average power reduces, and the bit rate requirement reduces, the average bit rate of the user reduces. Typically, the utility function U is a function of the bit rate. As the average user bit rate decreases, the corresponding utility decreases. However, reducing the bit rate requirement of unhappy users (provided that the bit rate requirement is still above the minimum tolerable bit rate), can reduce the overall average power of the system.

Load computation is an important aspect of LTE, and is relevant in the context of admission control, congestion control, and load balancing. A proper quantification of cell load is needed in order to determine whether a cell can admit new bearers. When the cell is highly loaded, further entry of radio bearers may be prevented in order to maintain the call quality of the existing bearers. Once admitted into the system, the cell load can still fluctuate due to the channel quality variations as a result of channel fading and mobility, etc. Thus, the system would need to cope with such load fluctuation, and some existing bearers may need to be dropped if necessary.

The simplest way to compute the cell load is to compute the average number of resource blocks used relative to the total number of resource blocks of the bandwidth. One drawback of this approach is that it tends to over-estimate the load, especially in the presence of best-effort traffic, and thereby potentially causes inefficient utilization of resources. A more sophisticated way to define cell load for LTE has been proposed in R. Kwan, R. Arnott, et. al. "On Radio Admission Control for LTE Systems", *proc. of IEEE VTC-fall*, 2010. To compute the cell load, the required number of resource blocks per bearer is obtained, based on the ratio of the required bit rate and the spectral efficiency per resource block of the user. This quantity is then normalized by the total number of resource blocks in the system bandwidth, and summed over all active bearers in the system.

However, this approach assumes a constant power spectral density across the bandwidth. This assumption is valid when frequency-selective power control is not used. However, in the presence of power control across the bandwidth, i.e. each sub-band can potentially take on a different power level, such an approach would potentially underestimate the load, because power is non-uniformly distributed across the sub-bands, thereby reducing the usability of some sub-bands.

In order to overcome this problem, the load can be defined as:

$$\rho_k = \sum_i \frac{\tilde{R}_{k,i}}{\overline{R}_{k,i}} \frac{\overline{P}_{k,i}}{\tilde{P}_k} \qquad (19)$$

where $\tilde{R}_{k,i}$ and $\overline{R}_{k,i}$ are the required and average bit rate for user i in cell k respectively, and $\overline{P}_{k,i}$ and $\tilde{P}_k$ are the average power for user i in cell k and the maximum downlink power limit for cell k respectively. The quantity $\mu_{k,i}=\overline{R}_{k,i}/\overline{P}_{k,i}$ can be interpreted as the rate per unit power, which quantifies the power efficiency of the user. Thus, the quantity $\tilde{R}_{k,i}/\mu_{k,i}$ refers to the power potentially required to achieve the required bit rate. Subsequently, the required power normalized by the total power gives the relative required power contribution of the user within the system.

Note that it is possible for a user to have multiple bearers. In this case, it is more useful to define i as the index of the bearer in the system. Also, in practice, it is possible for a user or a bearer to achieve a very low bit rate, and thereby causing a high load fluctuation. To overcome this, an alternative version of equation (19) is given by $$\rho_k = \sum_i \min\left(C_i, \frac{\tilde{R}_{k,i}}{\overline{R}_{k,i}}\right) \frac{\overline{P}_{k,i}}{\tilde{P}_k}, \qquad (20)$$

where a positive constant $C_i$ is used to put an upper limit on the bit rate ratio, and reduce potential instability.

There is thus described a method of deploying femtocells that allows power setting to take account of the user requirements.

The invention claimed is:

1. A method of controlling respective transmit powers allocated by a base station of a cellular communications network to each of a plurality of sub-bands, the method comprising:
   receiving information from at least one other base station of said network, said information comprising information about a sensitivity of a utility function in a cell served by said other base station to changes in downlink transmission powers allocated to respective sub-bands by said base station,
   identifying a sub-band in which it would be relatively advantageous to increase a downlink transmit power;
   determining whether a factor relating to a service expectation of users in the cell exceeds a threshold value, wherein the factor is defined by each of a respective user's average bit rate divided by the respective user's required bit rate; and
   increasing the downlink transmit power in the identified sub-band only if the factor is less than the threshold value.

2. A method as claimed in claim 1, wherein the factor is defined based on an average service expectation of users in the cell served by the base station.

3. A method as claimed in claim 2, wherein the factor is defined based on a weighted average service expectation of users in the cell served by the base station.

4. A method as claimed in claim 2, wherein the factor is defined based on a standard deviation of the service expectation of users in the cell served by the base station.

5. A method as claimed in claim 2, wherein the factor is defined based on a percentile of the service expectation of users in the cell served by the base station.

6. A method as claimed in claim 5, wherein the factor is defined based on a scaling factor that introduces a degree of conservativeness.

7. A method as claimed in claim 6, comprising adjusting the scaling factor based on a current transmit power in the cell.

8. A method as claimed in claim 7, comprising adjusting the scaling factor based on a measured interference in the cell.

9. A method of determining an effect of interference in a cell served by a base station of a cellular communications network, said interference being caused by transmissions from a base station in at least one neighbouring cell of said network, the method comprising:
   obtaining measurements from mobile devices connected to the base station; and
   using the measurements to derive a measure of sensitivity of a utility function in said cell served by said base station to changes in downlink transmission powers allocated to respective sub-bands by said base station in said at least one neighbouring cell of said network.

10. A method as claimed in claim 9, comprising:
    obtaining measurements from said mobile devices in a plurality of sub-bands.

11. A method as claimed in claim 10, comprising:
    repeatedly obtaining each of said measurements, and forming a time averaged value for each of said measurements.

12. A method as claimed in claim 11, comprising forming average measurements from measurements taken by a plurality of mobile devices, for each of said sub-bands.

13. A method as claimed in claim 12, comprising, for each average measurement that is below a threshold value, setting the sensitivity of the utility function for each of a corresponding sub-band to a negative value.

14. A method as claimed in claim 13, wherein said measurements are Channel quality indicator measurements.

* * * * *